United States Patent [19]
Kishigami et al.

[11] Patent Number: 5,155,817
[45] Date of Patent: Oct. 13, 1992

[54] MICROPROCESSOR

[75] Inventors: Hidechika Kishigami; Misao Miyata, both of Yokohama, Japan

[73] Assignee: Kabushiki Kaisha Toshiba, Kawasaki, Japan

[21] Appl. No.: 332,692

[22] Filed: Apr. 3, 1989

[30] Foreign Application Priority Data

Apr. 1, 1988 [JP] Japan .................. 63-78207

[51] Int. Cl.⁵ .............................................. G06F 9/38
[52] U.S. Cl. .......................... 395/375; 364/DIG. 1; 364/231.8; 364/247; 364/247.4; 364/262.4; 364/263; 364/263.1
[58] Field of Search ... 364/200 MS File, 900 MS File; 395/375, 800, 775

[56] References Cited

U.S. PATENT DOCUMENTS

| | | | |
|---|---|---|---|
| 3,215,987 | 11/1965 | Terzian | 364/200 |
| 3,778,775 | 12/1973 | Haring et al. | 364/900 |
| 3,872,447 | 3/1975 | Tessera et al. | 364/200 |
| 4,024,504 | 5/1977 | Chowning et al. | 364/200 |
| 4,312,034 | 1/1982 | Gunter et al. | 364/200 |
| 4,410,959 | 10/1983 | Tajima et al. | 364/900 |
| 4,439,839 | 3/1984 | Kneib et al. | 364/900 |
| 4,589,065 | 5/1986 | Auslander et al. | 364/200 |

OTHER PUBLICATIONS

Kosei Okamoto et al., "Design Considerations for 32bit Microprocessor TX3", IEEE, 1988, pp. 25-29.

Primary Examiner—Michael R. Fleming
Assistant Examiner—Debra A. Chun
Attorney, Agent, or Firm—Foley & Lardner

[57] ABSTRACT

A microprocessor employs pipelined architecture and comprises a first execution processor for executing and processing a first kind of instructions among decoded instructions according to microprogram control, a second execution processor for executing and processing a second kind of instructions which are different from the first kind of instructions according to hardwired control, and a controller. The controller issues decoded instructions in a program sequence, selectively determines for each of the decoded instructions which of the first and second execution processors shall execute and process an instruction, and operates the first and second execution processors independently of each other and in parallel with each other.

5 Claims, 16 Drawing Sheets

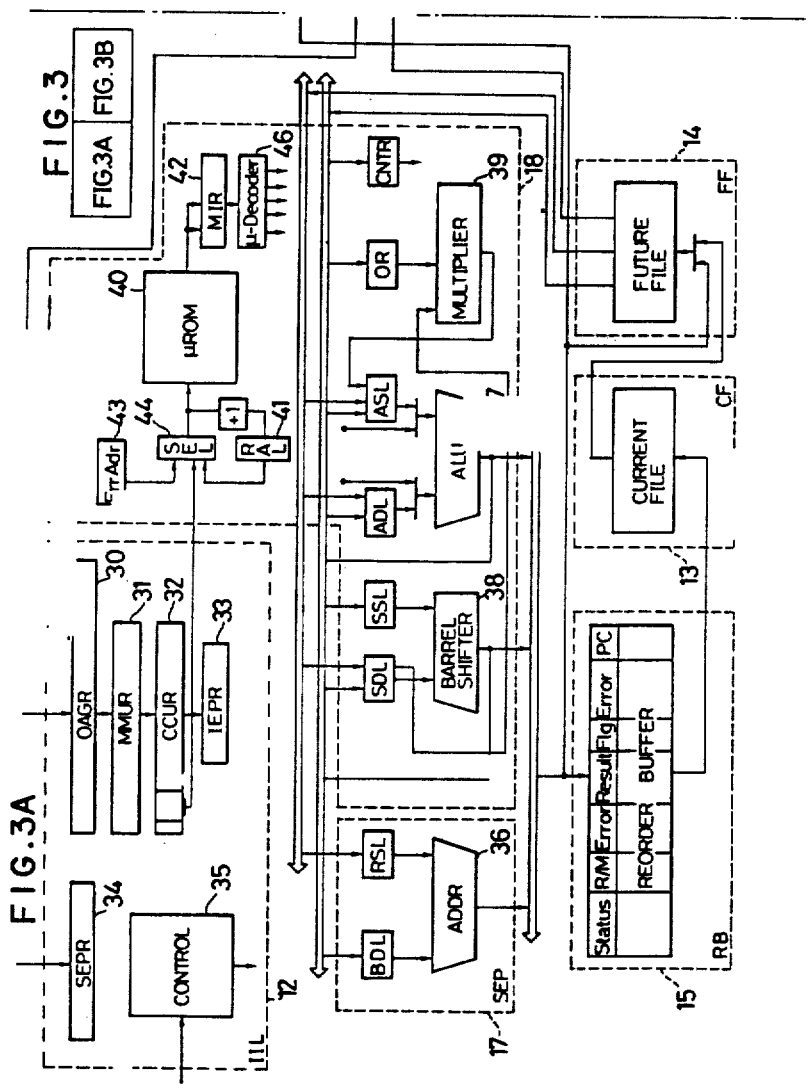

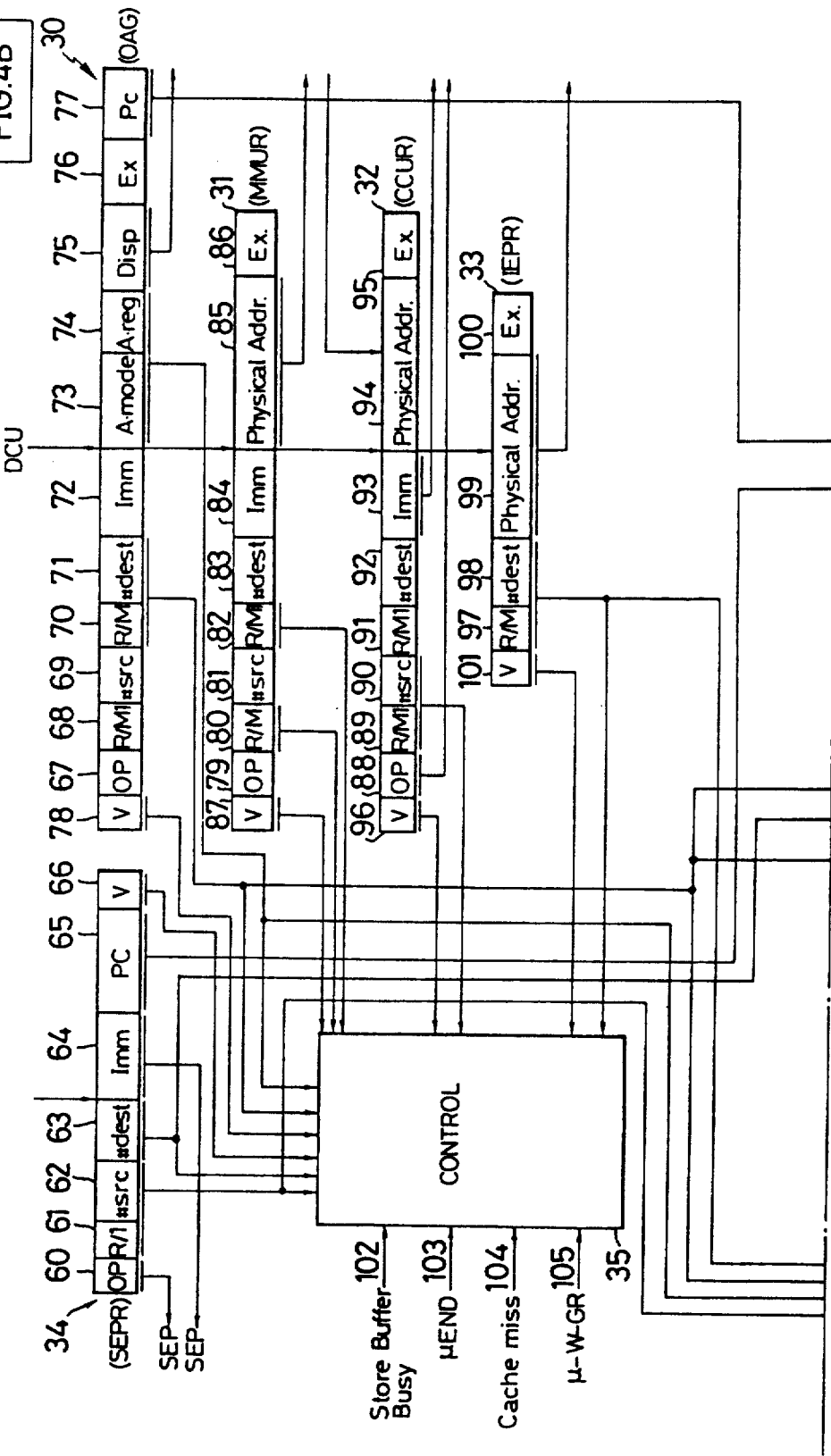

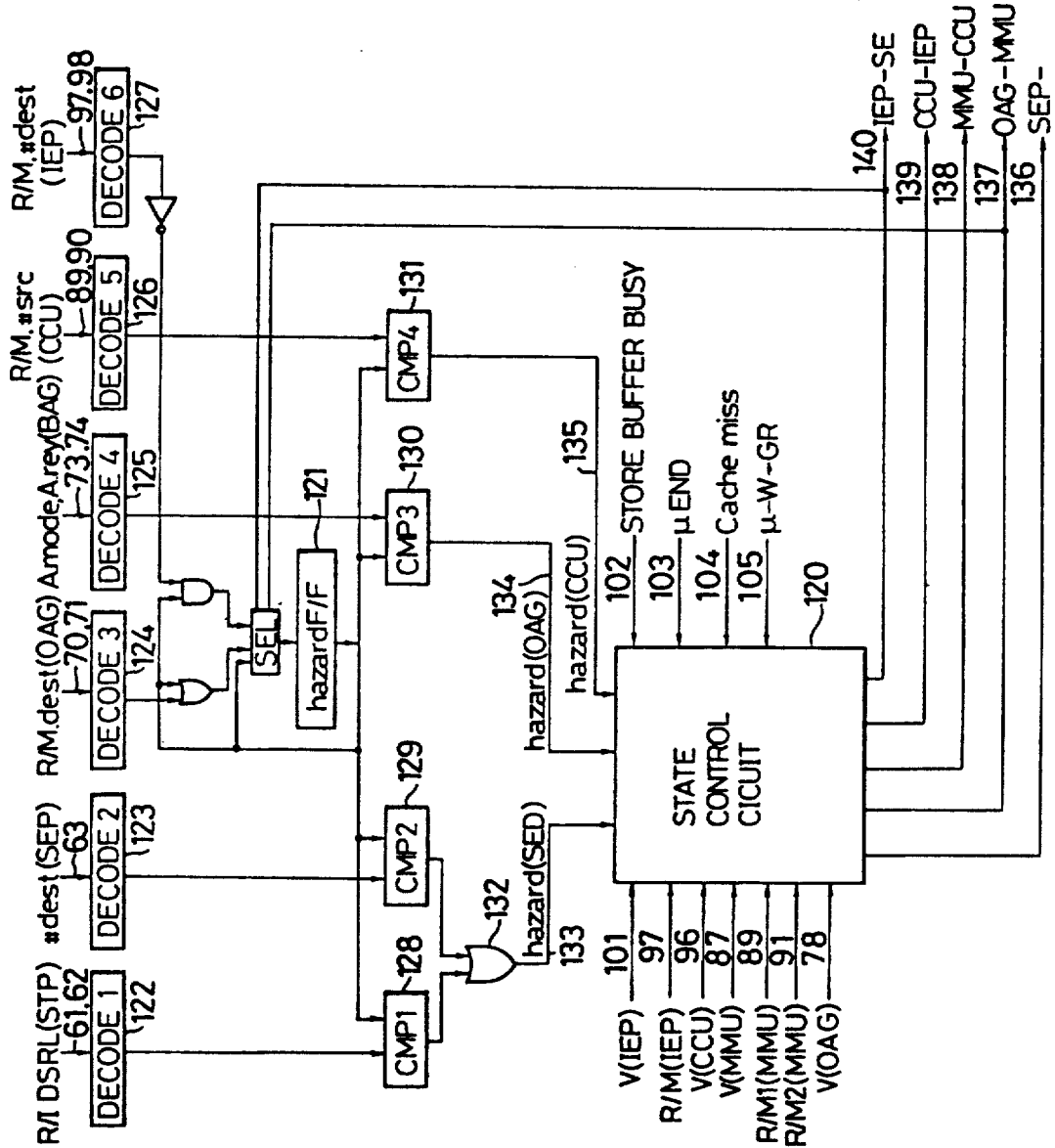
F I G. 5

FIG. 7

$I_{m1} \rightarrow I_{R2} \rightarrow I_{m3} \rightarrow I_{R4} \rightarrow I_{m5} \rightarrow I_{R6}$

| CYCLE STAGE | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| (DILB) | | $I_{R2}$ $I_{R4}$ $I_{R6}$ | | | | | | | | | | | | | | | | |
| OAG | $I_{m1}$ | $I_{m3}$ $I_{m5}$ | | | | | | | | | | | | | | | | |
| MMU | | $I_{m1}$ $I_{m3}$ $I_{m5}$ | | | | | | | | | | | | | | | | |
| OF | | | $I_{m1}$ $I_{m3}$ $I_{m5}$ | | | | | | | | | | | | | | | |
| IEP | | | | $I_{m1}$ $I_{m3}$ $I_{m5}$ | | | | | | | | | | | | | | |
| OS | | | | | $I_{m1}$ $I_{m5}$ | | | | | | | | | | | | | |
| SEP | | $I_{R2}$ | $I_{R4}$ | $I_{R6}$ | | | | | | | | | | | | | | |
| RB 1 | | | x $I_{m1}$ $I_{R2}$ | x $I_{m1}$ $I_{R2}$ | x $I_{m1}$ $I_{R2}$ | · $I_{m1}$ $I_{R2}$ | · $I_{R2}$ | | | | | | | | | | | |
| 2 | | | | x $I_{m3}$ | x $I_{m3}$ | x $I_{m3}$ | · $I_{m3}$ | | | | | | | | | | | |
| 3 | | | | | · $I_{R4}$ | · $I_{R4}$ | · $I_{R4}$ | · $I_{R4}$ | · $I_{R4}$ | | | | | | | | | |
| 4 | | | | | | x $I_{m5}$ | x $I_{m5}$ | $I_{m5}$ | · $I_{m5}$ | · $I_{m5}$ | | | | | | | | |
| 5 | | | | | | · $I_{R6}$ | · $I_{R6}$ | · $I_{R6}$ | · $I_{R6}$ | · $I_{R6}$ | · $I_{R6}$ | | | | | | | |
| 6 | | | | | | | | | | | | | | | | | | |
| 7 | | | | | | | | | | | | | | | | | | |
| 8 | | | | | | | | | | | | | | | | | | |
| FF | | $\uparrow I_{R2}$ | $\uparrow I_{R4}$ | $\uparrow I_{R6}$ | $\uparrow I_{m1}$ | $\uparrow I_{m3}$ | | | | | | | | | | | | |
| CF | | | | | | | $\uparrow I_{m1}$ | $\uparrow I_{R2}$ | $\uparrow I_{m3}$ | $\uparrow I_{R4}$ | | $\uparrow I_{R6}$ | | | | | | |

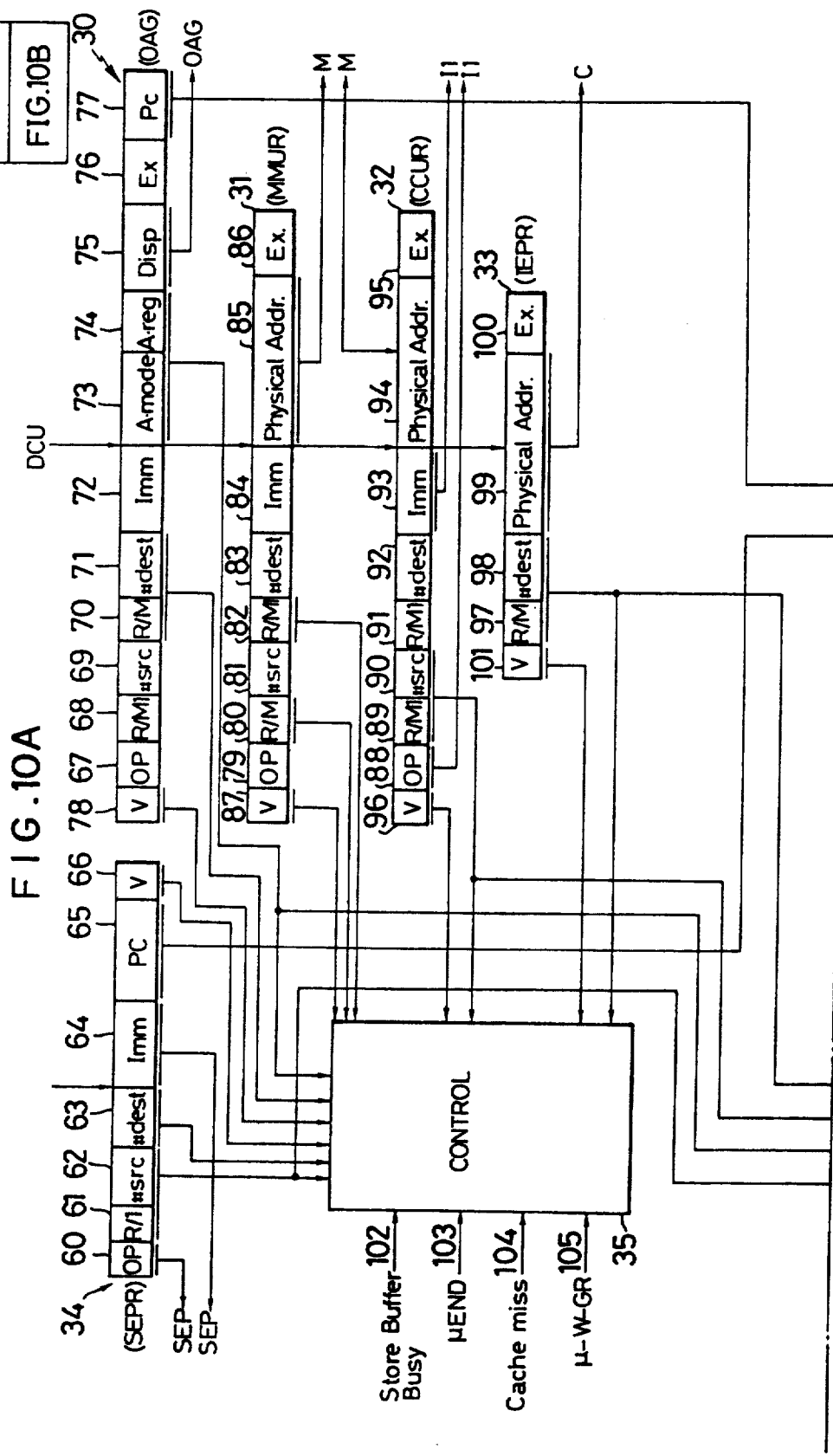

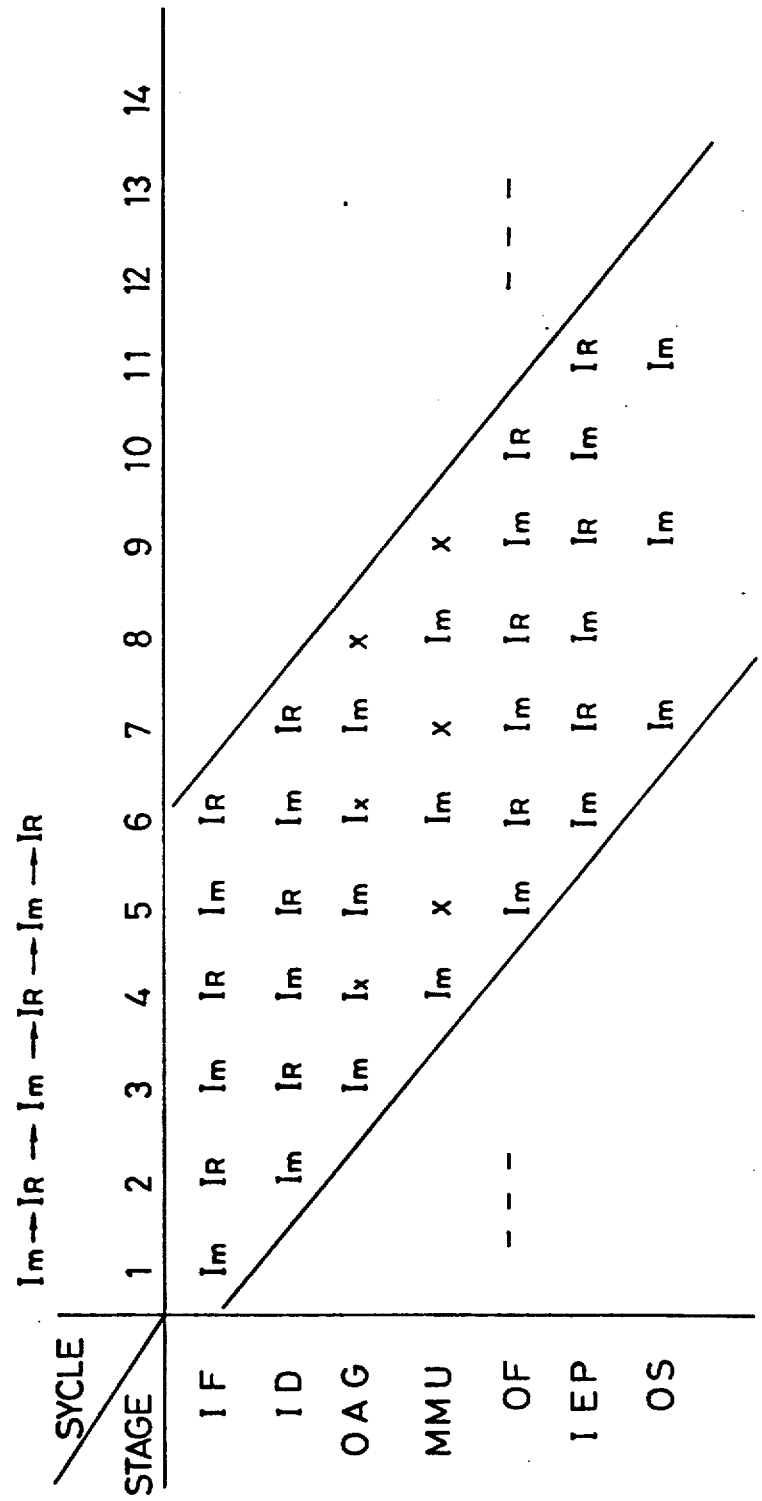

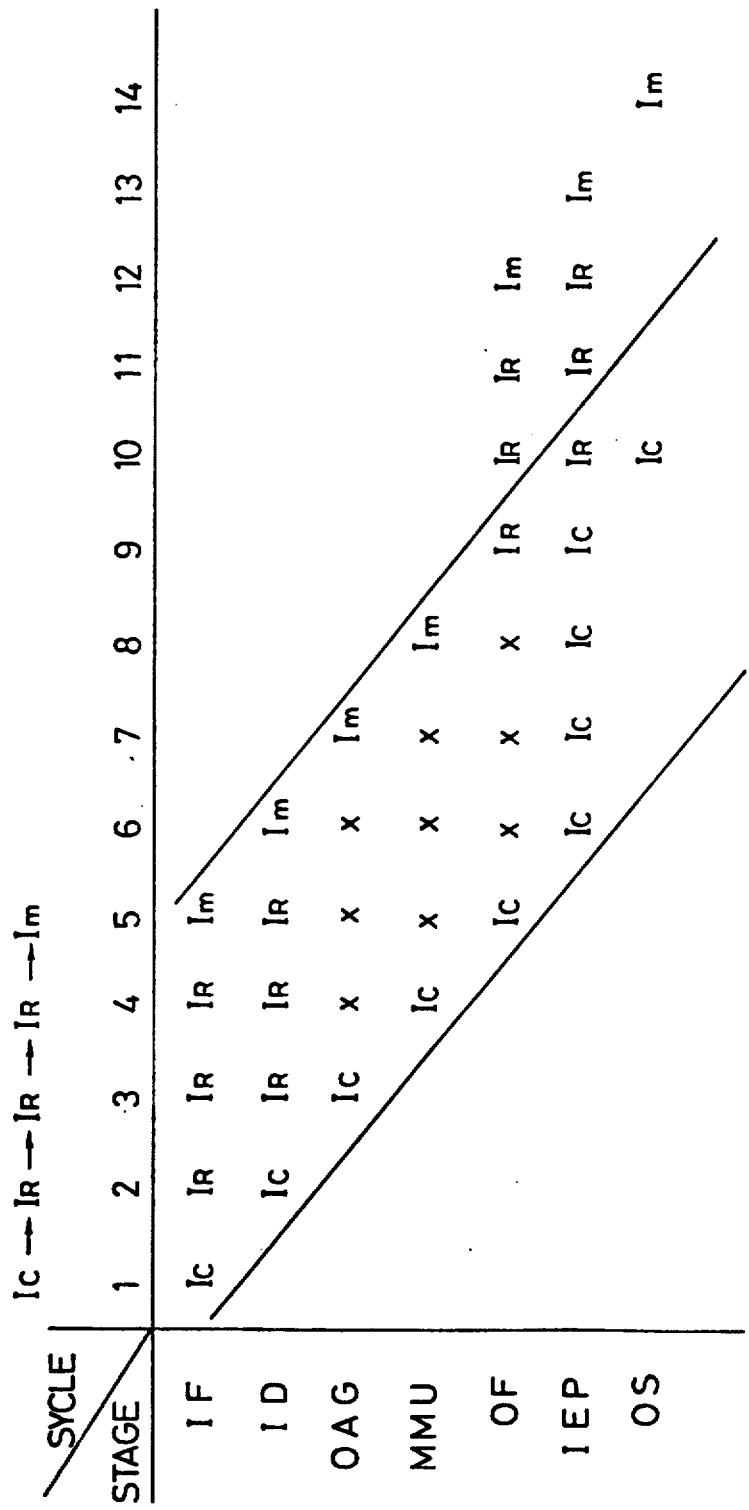

MICROPROCESSOR

BACKGROUND OF THE INVENTION

1. Field of the Invention

The present invention relates to microprocessors employing pipelined architecture for executing and processing instructions, and particularly to microprocessors which can suppress a disturbance occurring in the pipelined architecture to effectively improve performance of the microprocessors.

2. Description of Prior Art

In recent years, microprocessors tend to employ the pipelined architecture in executing and processing instructions to improve performance of the microprocessors. Pipelined architecture generally comprises the stages of instruction fetch, instruction decode, effective address calculation address conversion, operand read, instruction execution and operand write, as described in "The Whole Picture of 32-Bit Microprocessors, Enterprises, Strategy, Technology and Market Trends," NIKKEI-McGRAW-HILL, INC., pp. 137 to 139.

In this sort of pipelined architecture, a high-function instruction "Im" having a memory operand will be processed in the effective address calculation stage to calculate an effective address of the instruction Im and in the address conversion stage to convert the effective address into a physical address. However, these address calculation and conversion stages are not necessary for a basic instruction "IR" having no memory operand.

FIG. 12 shows flows of a sequence of instructions Im, IR, Im, IR, Im and IR which are pipeline-processed. In figure, it is assumed that a process of each pipeline stage is completed in a single cycle and that an operand write process of each high-function instruction Im is carried out with respect to a register and completed in the execution stage. A mark "x" indicates that a corresponding stage in a corresponding cycle is idle in operation.

As apparent in FIG. 12, the effective address calculation stage is idle in cycles 4 and 6, and the address conversion stage is idle in cycles 5 and 7. Namely, an operating ratio of each of these two stages is 50%.

A complex instruction set computer (CISC) type microprocessor employs sets of complex high-function instructions "Ic" each requiring several cycles in its execution stage.

FIG. 13 shows flows of a sequence of instructions Ic, IR, IR, IR and Im which are pipeline-processed in the CISC type microprocessor. In this figure, the instruction Ic needs four cycles in the execution stage. A mark "x" in FIG. 13 indicates that a corresponding stage in a corresponding cycle is idle in operation.

As is apparent in FIG. 13, the instruction Ic requiring four cycles in execution causes a so-called "pipeline disturbance." Due to this, execution of all the instructions is not completed in an ideal pipeline flow represented with a hatched portion in FIG. 13, but the execution needs additional three cycles (cycles 12 to 14) more than the ideal flow.

Since the instruction Ic needs four cycles for executing the same, idling occurs in the stages of effective address calculation, address conversion and operand read.

The disturbance will not occur if the high-function instructions Im each having a memory operand and the basic instructions IR having no memory operand are alternately executed. However, even with no pipeline disturbance, the microprocessor may suffer from deterioration of operating ratios in the effective address calculation and address conversion stages, as shown in FIG. 12.

When the complex high-function instructions Ic each requiring several cycles in execution are involved, the pipeline disturbance unavoidably occurs to deteriorate performance of the microprocessor, in addition to the operating ratio deterioration occurring in the above-mentioned stages.

SUMMARY OF THE INVENTION

To solve these problems, an object of the present invention is to provide a microprocessor which can prevent operating ratios of respective pipeline stages from deteriorating and suppress occurrence of the disturbance, thus effectively improving performance of the microprocessor.

In order to accomplish this object, the microprocessor of the present invention comprises a first execution processing unit for executing and processing high-function instructions each having a memory operand or requiring complicated processes, among decoded instructions under the control of microprograms. The microprocessor further comprises a second execution processing unit for executing and processing basic instructions which are different from the high-function instructions and have no memory operand, according to hard-wired control. The microprocessor further comprises a control unit for issuing the decoded instructions in the order of a program sequence, selectively determining for each of the issued instructions which of the first and second execution processing units shall execute and process the instruction, and operating the first and second execution processing units independently of each other and in parallel with each other.

The microprocessor according to the invention further comprises a first information-holding unit. Immediately after the execution of an instruction in the first or second execution processing unit, a result of the execution is written in the first information-holding unit. The microprocessor further comprises a second information-holding unit in which results of execution of instructions in the first and second execution processing units are written correctly in order of the program sequence of the control means. The microprocessor further comprises a third information-holding unit for holding information related to the instructions issued by the control unit and information related to the execution and termination states of the instructions in the program sequence to update the second information-holding unit correctly in the order of the program sequence of the control unit.

With the microprocessor of the above-mentioned arrangement, the high-function instructions and basic instructions are pipeline-processed independently so that the high-function and basic instructions may be executed and processed in parallel or simultaneously.

Execution of an instruction issued by the control unit is started when the first information-holding unit is updated. When a program sequence returns to a main routine after executing a subroutine which is external to the main routine, an instruction to be executed is determined according to the contents of the second information-holding unit to again execute instructions of the main routine.

According to information related to the issued instructions and according to information related to the execution and termination states of the instructions, the contents of the second information holding unit are updated correctly in the order of the program sequence.

These and other objects, features and advantages of the present invention will be more apparent from the following detailed description of preferred embodiments in conjunction with the accompanying drawings.

BRIEF DESCRIPTION OF THE DRAWINGS

FIGS. 3, 3A and 3B comprise a block diagram showing the details of respective blocks shown in FIG. 2;

FIGS. 4, 4A and 4B comprise a view showing the details of an instruction issue logic (IIL), a reorder buffer (RB), current file (CF) and future file (FF) shown in FIG. 3;

FIG. 5 is a view showing the details of a control circuit shown in FIG. 4;

FIGS. 7 and 8 are timing charts showing pipeline processing operations according to an embodiment of the present invention;

FIGS. 12 and 13 are timing charts showing pipeline processing operations according to the prior art.

DETAILED DESCRIPTION OF THE EMBODIMENTS

Figure 1:
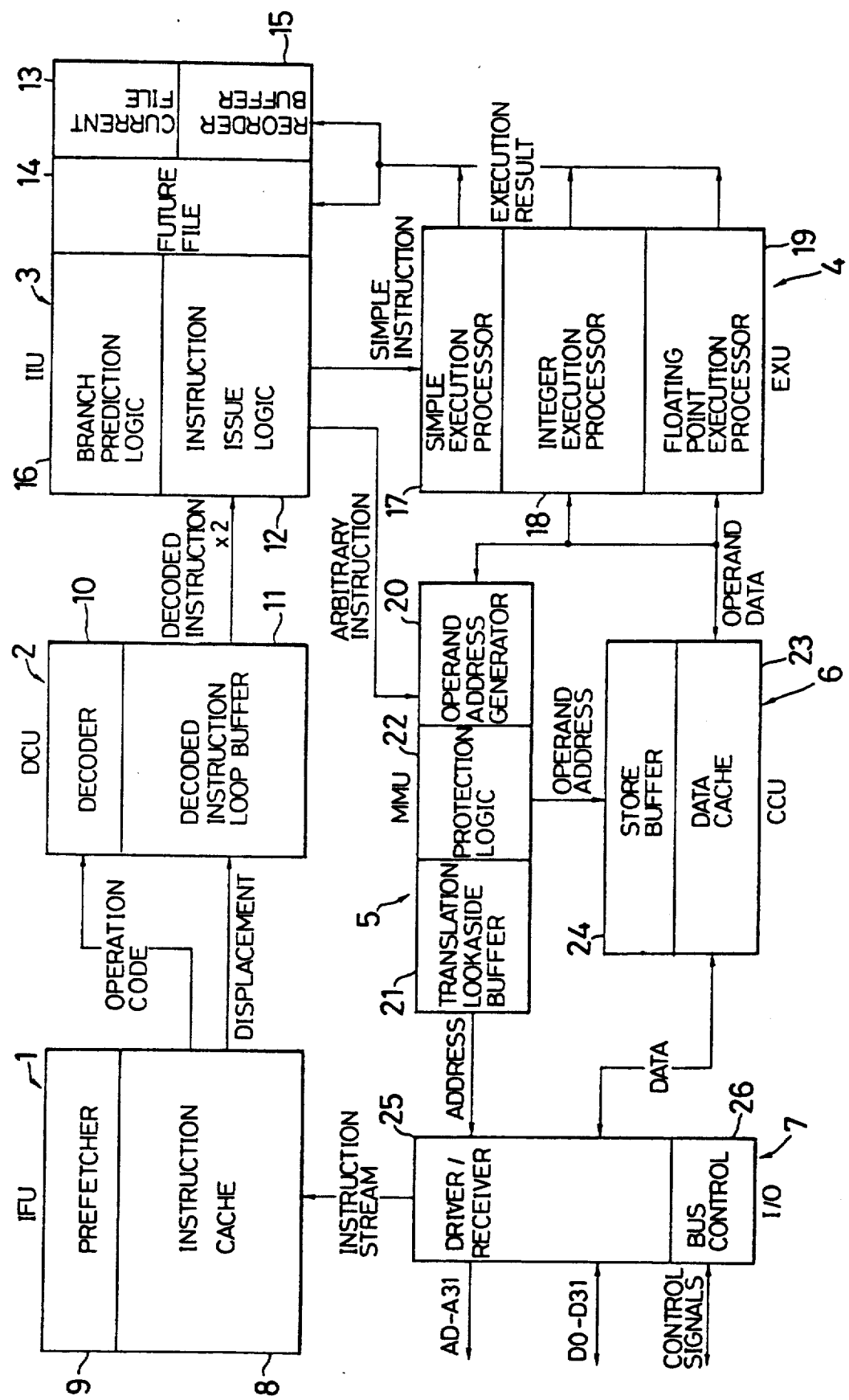
FIG. 1 is a block diagram generally showing the internal structure of a microprocessor according to a prototype of the present invention.

FIG. 1 is a block diagram generally showing internal structure of a microprocessor according to a prototype of the present invention.

The microprocessor comprises an instruction fetch unit (IFU) 1 for fetching instruction data from a main storage, a decode unit (DCU) 2 for decoding the instruction data from the instruction fetch unit 1, an instruction issue unit (IIU) 3 for issuing instruction information for respective kinds of instructions, i.e., basic instructions each having no memory operand, basic instructions each having a memory operand, and high-function instructions each requiring complicated processes, according to the information sent from the decode unit 2, an instruction execution unit (EXU) 4 for executing the instructions according to hard-wired control or according to microprogram control depending on the kinds of the instructions, a memory management unit (MMU) 5 for generating addresses of the memory operands of the high-function instructions, a cache control unit (CCU) 6 for controlling operand data, and an input and output portion (I/O) 7 for controlling data input and output between the microprocessor and the outside.

The instruction fetch unit (IFU) 1 is of conventional type and mainly comprises an instruction cache 8 for holding copies of some of instruction data groups stored in the main storage, and a prefetcher 9 for fetching the instruction data from the main storage to the instruction cache 8.

The decode unit (DCU) 2 mainly comprises an instruction decoder 10 for decoding instruction codes, and a decoded instruction loop buffer 11 for temporarily holding a plurality of decoded instructions. According to this embodiment, two pieces of decoded instruction information are read from the decoded instruction loop buffer 11 at a time (in a single cycle) and transferred to the instruction issue unit (IIU) 3. However, the decoded instruction loop buffer 11 and the function of reading two instructions at a time are not indispensable for the invention.

The instruction issue unit (IIU) 3 mainly comprises an instruction issue logic (IIL) 12 for issuing instruction information based on the information sent from the decode unit 2 to the instruction execution unit (EXU) 4 or to the memory management unit (MMU) 5 depending on the kind of the information, a current file (CF) 13, a future file (FF) 14, and a reorder buffer (RB) 15. The files 13 and 14 and the buffer 15 hold values of general-purpose registers. The instruction issue logic (IIL) 12 has, in addition to the functions (such as a function of detecting a hazard and a function of controlling respective pipeline stages) of a pipeline control circuit incorporated in a standard pipeline architecture microprocessor, a function of selectively determining whether instruction information sent to the IIL 12 is related to the basic instruction having no memory operand, to the basic instruction having a memory operand, or to the high-function instruction requiring complicated processes, a function of controlling a plurality of instruction execution portions to be described later to execute respective instructions in the execution portions in parallel, and a function of controlling the reorder buffer 15 to correctly rearrange results of execution of the instructions executed in the plural execution portions and may be out of the program sequence, into the program sequence.

The current file 13 is updated in the order of the program sequence. However, the future file 14 is updated with no regard to the program sequence immediately after each instruction is executed in the instruction execution unit (EXU) 4. The reorder buffer 15 temporarily holds results of execution of instructions which have been executed with no regard to the program sequence in the plural instruction execution portions of the instruction execution unit (EXU) 4, and updates the current file 13 according to the program sequence.

The number of cycles needed for executing the basic instruction differs from that needed for executing the high-function instruction. In this prototype, these instructions having different execution cycles are executed in the plural instruction execution portions appropriate for the respective instructions. Due to this, the instructions which have been issued in a program sequence may be executed out of the program sequence or in a reversed sequence.

To cope with this, the reorder buffer 15 updates the contents of registers in the current file 13 according to the program sequence to recover the program sequence which may have been reversed. Namely, the reorder buffer 15 functions to reorder the instructions which have been terminated out of the program sequence.

With this arrangement, if an extra program such as an interruption external to a main routine is executed, the contents of the current file 13 are referred to in order to restart the execution of instructions of the main routine.

The instruction issue unit (IIU) 3 further comprises branch prediction logic 16 for executing branch instructions at high speed.

The instruction issue logic (IIL) 12, current file (CF) 13, future file (FF) 14 and reorder buffer (RB) 15 are required for the prototype of the present invention. However, the object of the invention may be achieved without employing the reorder buffer 15. This will be explained later with reference to the embodiment of the invention. The current file 13 and future file 14 may not necessarily be separate physical files but they may be different portions of a single register file.

The instruction execution unit (EXU) 4 executes instructions according to hard-wired control or according to microprogram control. In this prototype, the instruction execution unit (EXU) 4 comprises a simple execution processor (SEP) 17 for executing the basic instructions such as comparison instructions, transfer instructions and arithmetic logic operation instructions having no memory operand according to hard-wired control, an integer execution processor (IEP) 18 for executing the basic instructions each having a memory operand or the high-function instructions each requiring complicated processes according to microprogram control, and a floating execution processor 19 for executing floating operation instructions.

The prototype is characterized by the plural instruction execution portions for executing the respective kinds of instructions. The number of the instruction execution portions is not limited to three. A modification thereof may comprise a common portion which executes the basic instructions having no memory operand and calculates effective addresses of operands of another kind of instructions.

The memory management unit (MMU) 5 is of conventional type and mainly comprises an operand address generator 20 for generating an effective address (logic address) of a memory operand, a translation lookaside buffer 21 for converting the effective address into a physical address, and protection logic 22 for checking memory protection.

The cache control unit (CCU) 6 is of conventional type and mainly comprises a data cache 23 for holding copies of some of the operand data groups stored in the main storage, and a store buffer 24 for temporarily holding operand data to be written.

The input and output portion (I/O) 7 is of conventional type and controls data input and output between the microprocessor and the outside thereof. The I/O portion 7 mainly comprises a driver/receiver 25 and a bus control 26.

Figure 2:
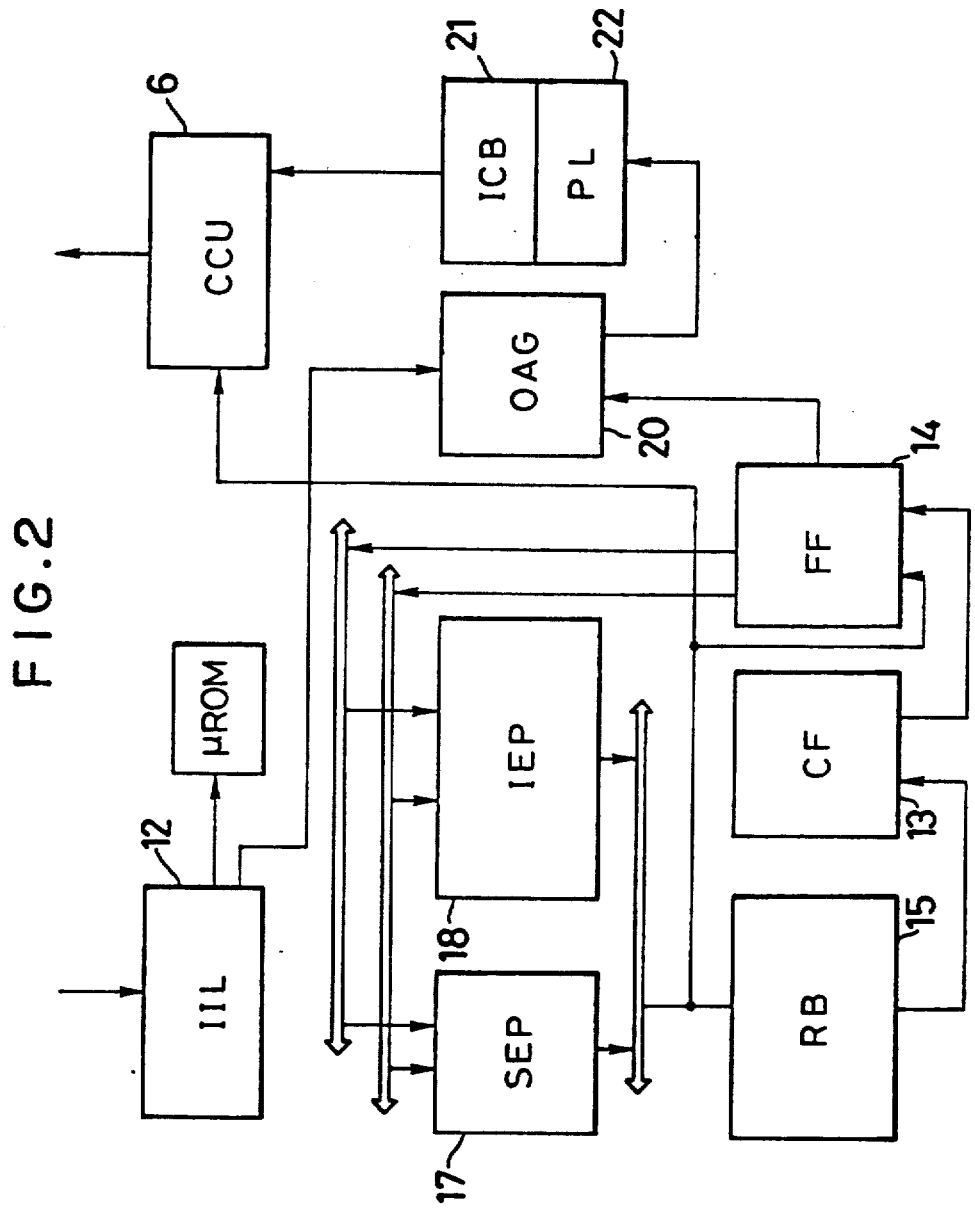
FIG. 2 is a block diagram showing essential parts of the microprocessor shown in FIG. 2.

FIG. 2 is a view showing essential blocks particularly related to the prototype among the internal blocks of the microprocessor shown in FIG. 1. In FIG. 2, buses are represented with double lines and data lines with single lines.

Figure 3B:
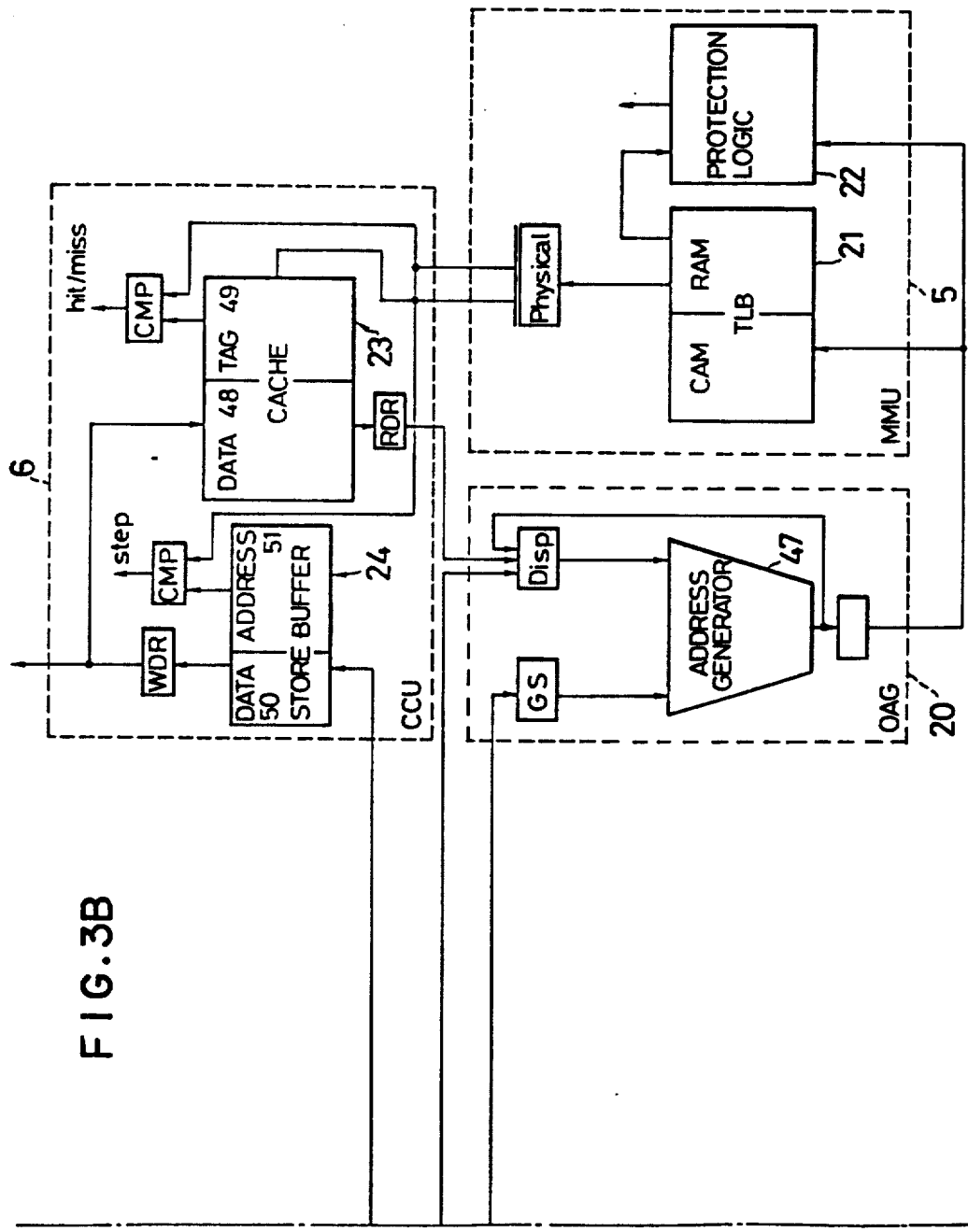

FIGS. 3, 3A and 3B comprise a view showing the details of the inside of each of the blocks shown in FIG. 2.

In FIG. 3, the instruction issue logic (IIL) 12 comprises pipeline registers OAGR 30, MMUR 31, CCUR 32, IEPR 33 and SEPR 34 for holding information pieces related to instructions under execution in respective pipeline stages, and a control circuit 35 for controlling flows of the instructions through the pipeline stages according to the information pieces stored in the pipeline registers. The flows of the instructions through the pipeline stages will be explained later with reference to FIGS. 7 and 8. The control circuit 35 also controls the reorder buffer (RB) 15 to register and erase data in and from the RB 15.

In this embodiment, the instruction issue logic (IIL) 12 can receive two pieces of instruction information in a single cycle from the decoded instruction loop buffer (DILB) 11 of the decode unit (DUC) 2, subject to one of the information pieces being of the basic instruction having no memory operand.

The register SEPR 34 of the instruction issue logic (IIL) 12 holds information related to a basic instruction under execution in the simple execution processor (SEP) 17.

The register OAGR 30 of the IIL 12 holds information related to an instruction whose effective address is being calculated in the operand address generator (OAG) 20.

The register MMUR 31 of the IIL 12 holds information related to an instruction whose address is being converted in the memory management unit (MMU) 5.

The register CCUR 32 of the IIL 12 holds information related to an instruction for which memory access (operand read) is being carried out in the cache control unit (CCU) 6.

The register IEPR 33 of the IIL 12 holds information related to an instruction which is being executed in the integer execution processor (IEP) 18.

Information related to operand write is held in the store buffer 24 of the cache control unit (CCU) 6 so that there is no register for this purpose in the instruction issue logic (IIL) 12. The details of IIL 12 will be explained later with reference to FIG. 4.

The simple execution processor (SEP) 17 is a block having an operation device (an adder) 36 for executing the basic instruction having no memory operand according to hard-wired control. The adder 36 is directly controlled by the register SEPR 34 of the instruction issue logic (IIL) 12.

The integer execution processor (IEP) 18 comprises operation devices such as an ALU 37, a barrel shifter 38 and a multiplier 39, a microprogram ROM 40 and a sequencer. A register RAL 41 holds an address of the microinstruction ROM 40. A register MIR 42 holds a microinstruction. A register ErrAdr 43 holds an address of the microinstruction ROM 40 to cope with the occurrence of error. A selector SEL 44 selects one of values stored in the registers RAL 41 and ErrAdr 43 and an operand field 88 of the register CCUR 32 of the instruction issue logic (IIL) 12. Namely, the selector SEL 44 selects the address of a first microinstruction to execute an instruction in the integer execution processor (IEP) 18.

The operand address generator (OAG) 20 comprises an adder (address generator) 47 for calculating the effective address of a memory operand.

The memory management unit (MMU) 5 comprises the translation lookaside buffer (TLB) 21 for holding address pairs for converting logic addresses (effective addresses) into physical addresses, and the access right checking circuit (protection logic) 22 for checking the right of memory access.

The cache control unit (CCU) 6 comprises the data cache 23 for holding copies of some of data stored in the main storage, and the store buffer 24 for temporarily holding information related to data to be written. The data cache 23 comprises a data portion 48 for holding data and a tag portion 49 for holding addresses and attributes. The store buffer 24 comprises a data portion 50 for holding data, and an address portion 51 for holding addresses. Write data sent from the integer execution processor (IEP) 18 are once stored in the store buffer 24 and then written in the cache 23 as well as in the main storage.

Figure 4B:
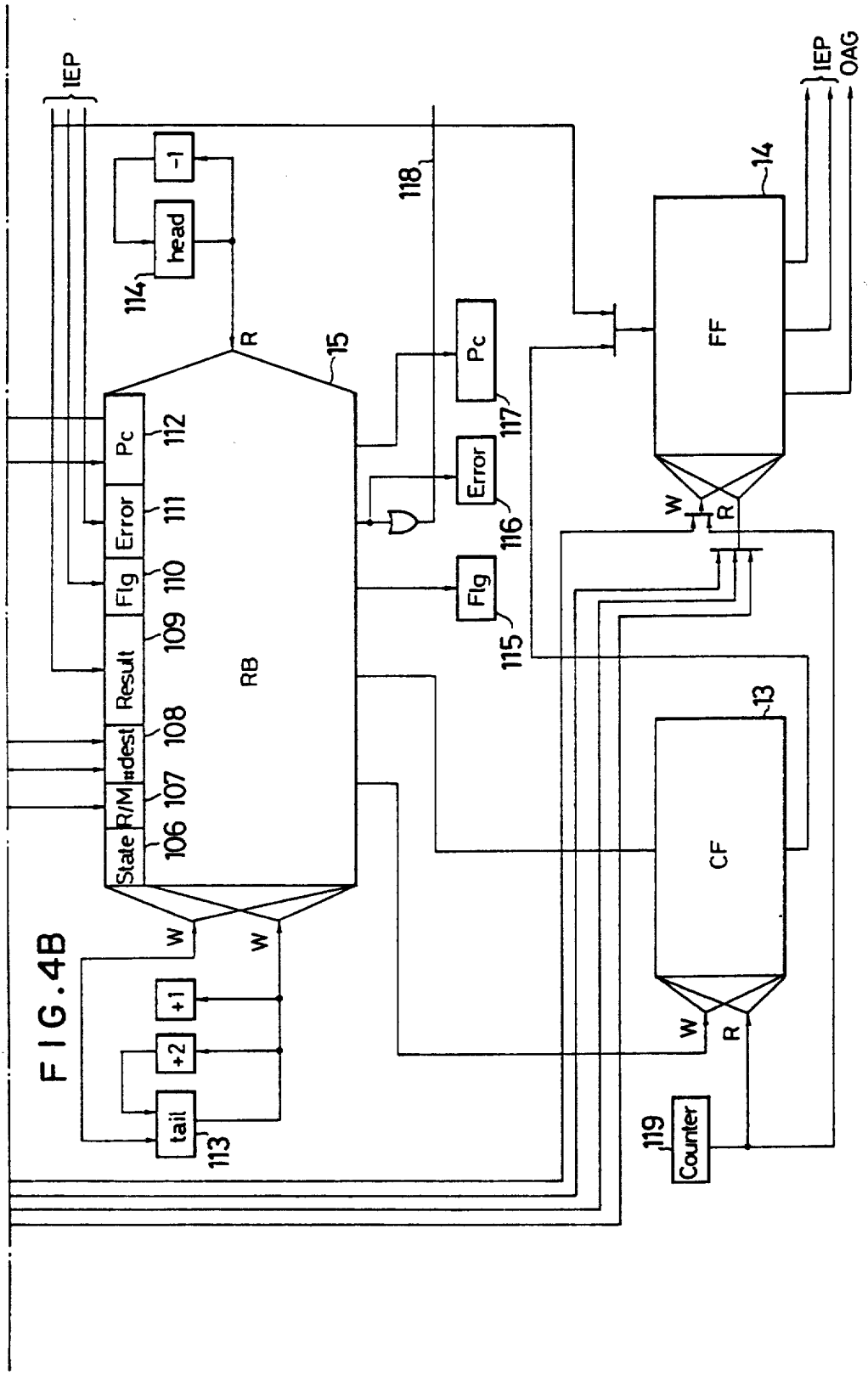

FIGS. 4, 4A and 4B comprise a view showing the details of the instruction issue logic (IIL) 12, reorder buffer (RB) 15, current file (CF) 13 and future file (FF) 14 shown in FIG. 3.

Information related to an instruction sent from the decoded instruction loop buffer 11 of the decode unit (DCU) 2 is stored in the register SEPR 34 or in the OAGR 30, depending on the kind of the instruction. The register SEPR 34 is allowed to store only information related to the basic instruction having no memory operand, while the register OAGR 30 can store information of any instruction.

The register SEPR 34 comprises the following fields:

a field OP 60 for indicating the kind of a basic instruction such as comparison, transfer and add, and controlling the adder of the simple execution processor (SEP) 17;

a field R/I 61 for indicating whether a source operand of the instruction is a register or immediate data;

a field #src 62 for specifying a register number of the source operand;

a field #dest 63 for specifying a register number of a destination operand;

a field Imm 64 for holding immediate data;

a field PC 65 for holding a first address of the instruction; and a field V 66 for holding a validity bit.

The register OAGR 30 comprises the following fields:

a field OP 67 for indicating the kind of an instruction;

a field R/MI 68 for indicating whether a source operand is a register or a memory;

a field #src 69 for specifying a register number of the source operand;

a field R/M 70 for indicating whether a destination operand is a register or a memory;

a field #dest 71 for specifying a register number of the destination operand;

a field Imm 72 for holding immediate data;

a field Amode 73 for specifying an addressing mode of the memory operand;

a field Areg 74 for specifying the number of a register to be used for the addressing mode of the memory operand;

a field Disp 75 for specifying a displacement used for the addressing mode of the memory operand;

a field Ex 76 as an extra field;

a field PC 77 for holding a first address of the instruction; and a field V 78 for holding a validity bit.

Pieces of information related to an instruction and stored in the register OAGR 30 are transferred to the registers OAGR 30, MMUR 31, CCUR 32 and IEPR 33 in this order as the instruction is progressively processed in the respective pipeline stages.

When the pieces of information are transferred from the register ORGR 30 to the register MMUR 31, the operand address generator (OAG) 20 calculates an effective address (a logic address) of a memory operand of the instruction according to information stored in the fields Amode 73, Areg 74 and Disp 75 of the register ORGR 30.

When the pieces of information are transferred from the register MMUR 31 to the register CCUR 32, the memory management unit (MMU) 5 converts the logic address of the operand of the instruction into a physical address, and checks the right of memory access.

When the pieces of information are transferred from the register CCUR 32 to the register IEPR 33, the microinstruction ROM 40 is accessed to read a first microinstruction necessary for executing the instruction, according to an information piece held in the field OP 88 of the register CCUR 32.

The control circuit 35 shown in FIG. 4 receives the pieces of instruction information held in the registers SEPR 34, OAGR 30, MMUR 31, CCUR 32 and IEPR 33, as well as the following signals:

a store buffer busy signal 102;

a microprogram termination signal ($\mu$END) 103;

a cache miss signal 104; and a write signal ($\mu$-w-GR) 105 generated by a microinstruction for a general-purpose register.

With these signals, the control circuit 35 controls pipeline states, detects hazard and generates control signals for controlling the reorder buffer (RB) 15. The details of the control circuit 35 will be explained later with reference to FIGS. 5 and 6.

The current file (CF) 13 is a register file for holding general-purpose register values that are updated according to a program sequence. The future file (FF) 14 is a register file for holding general-purpose register values that are updated immediately after the execution of instructions in the simple and integer execution of instructions in the simple and integer execution processors 17 and 18.

The reorder buffer (RB) 15 temporarily holds results of execution of instructions executed in the simple execution processor (SEP) 17 and integer execution processor (IEP) 18, where the execution of the instructions may be terminated not in order of the program sequence. Then, the reorder buffer (RB) 15 updates the current file (CF) 13 in order of the program sequence. In this embodiment, the reorder buffer (RB) 15 has eight entries each comprising the following fields:

a field State 106 for indicating the validity or invalidity and the under execution or termination of an instruction related to the entry in question;

a field R/M 107 for indicating whether a destination of the instruction is a register or a memory;

a field #dest 108 for indicating a register number when the destination is a register;

a field Result 109 for holding a result of execution of the instruction;

a field Flg 110 for holding a flag of the result of execution of the instruction;

a field Error 111 for indicating error information when an error occurs upon the execution of the instruction; and a field PC 112 for indicating a first address of the instruction.

Information is registered in the reorder buffer (RB) 15 at the time when the register SEPR 34 executed an instruction held therein, or at the time when pieces of instruction information held in the register OAGR 30 are transferred to the register MMUR 31.

In FIG. 4, a tail register 113 points a latest entry plus one among the entries of the RB 15, where the latest entry is holding the latest instruction information, and a head register 114 points an entry holding the oldest instruction information. Two entries of the RB 15 pointed by the tail register 113 and the tail register plus one can simultaneously receive a piece of instruction information each, in a single cycle.

If the field State 106 of an entry pointed to by the head register 114 is in an execution terminated state, corresponding values of the current file (CF) 13 and a register Flg 115 are updated according to an execution result held in the field Result 109 and a value of the field Flg 110 of the entry in question of the reorder buffer (RB) 15.

If there is error information in the field Error 111, an error signal is generated for a microprogram sequence control portion to execute a microprogram routine for an error process.

Data read from the reorder buffer (RB) 15 is carried out for one instruction per cycle at maximum.

When information of an instruction (instructions) is registered in the reorder buffer (RB) 15, the tail register 113 is counted up by 1 or 2. When data of an instruction are read out of the RB 15, the head register 114 is counted down by 1.

FIG. 5 is a view showing internal blocks of the control circuit 35 of the instruction issue logic (IIL) 12 shown in FIG. 4. The control circuit 35 comprises a portion for carrying out a hazard check based on information stored in the pipeline registers, and a state control circuit 120 for controlling the states of the pipeline stages according to validity signals of the pipeline registers, hazard check signals, etc.

In FIG. 5, a hazard F/F 121 is a 16-bit register. When instructions held in the pipeline registers MMUR 31, CCUR 32 and IEPR 33 write results in the general-purpose registers, corresponding bits of the hazard F/F 12 are "1" and, according to this information, the hazard F/F 121 carries out hazard detection. The hazard F/F 121 is set according to results of decoding the fields R/M 70 and #dest 71 of the register OAGR 30 by a decoder Decode 3 124, and the hazard F/F 121 is reset according to results of decoding the fields R/M 97 and #dest 98 of the register IEPR 33 by a decoder Decode 6 127.

An instruction held in the register SEPR 34 can be executed in the simple execution processor (SEP) 17 only when source and destination registers will never be rewritten, i.e., only when corresponding bits of the hazard F/F 121 are not "1". This requirement is detected by decoding the fields R/I 61, #src 62 and #dest 63 of the register SEPR 34 by decoders Decode 1 122 and Decode 2 123, comparing the decoded results with values of the hazard F/F 121 in comparison circuits CMP1 128 and CMP2 129, and checking an OR output signal (hazard(SEP)) 133 which is a result of the comparison. If the requirement is satisfied, the signal (hazard(SEP)) 133 will be 0 while the signal will be 1 if the requirement is not satisfied.

Similarly, results of decoding the fields Amode 73 and Areg 74 of the register OAGR 30 by a decoder Decode 4 125 are compared with a value of the hazard F/F 121 in a comparison circuit CMP3 130. If an output signal (hazard(OAG)) 134 based on a result of the comparison is 0, the operand address generator (OAG) 20 can calculate an effective address.

Further, results of decoding the fields R/M 89 and #src 90 of the register CCUR 32 are compared with a value of the hazard F/F 121 in a comparison circuit CMP4 131. If an output signal (hazard(CCU)) 135 based on a result of the comparison is 0, a source operand (register) can be read.

The state control circuit 120 receives the three hazard signals (hazard(SEP)) 133, (hazard(OAG)) 134 and (hazard(CCU)) 135, validity signals V(IEP) 101, V(CCU) 96, V(MMU) 87 and V(OAG) 78 and register/memory signals R/M(IEP) 97, R/M1(MMU) 89 and R/M2(MMU) 91 and signals from the outside of the instruction issue unit (IIL) 12, i.e., the Store Buffer Busy signal 102, μEND signal 103, Cache miss signal 104 and μ-W-GR signal 105, to output the following signals for controlling the pipeline states: a signal SEP 136 which is "1" when an instruction held in the register SEPR is executable in the simple execution processor (SEP);

a signal OAG-MMU 137 which is "1" when an instruction held in the register OAGR can advance to the register MMUR in the next cycle;

a signal MMU-CCU 138 which is "1" when an instruction held in the register MMUR can advance to the register CCUR in the next cycle;

a signal CCU-IEP 139 which is "1" when an instruction held in the register CCUR can advance to the register IEPR in the next cycle; and a signal IEP-SB 140 which is "1" when an instruction held in the register (IEPR) transfers information to the store buffer 24 in the next cycle.

Figure 6:
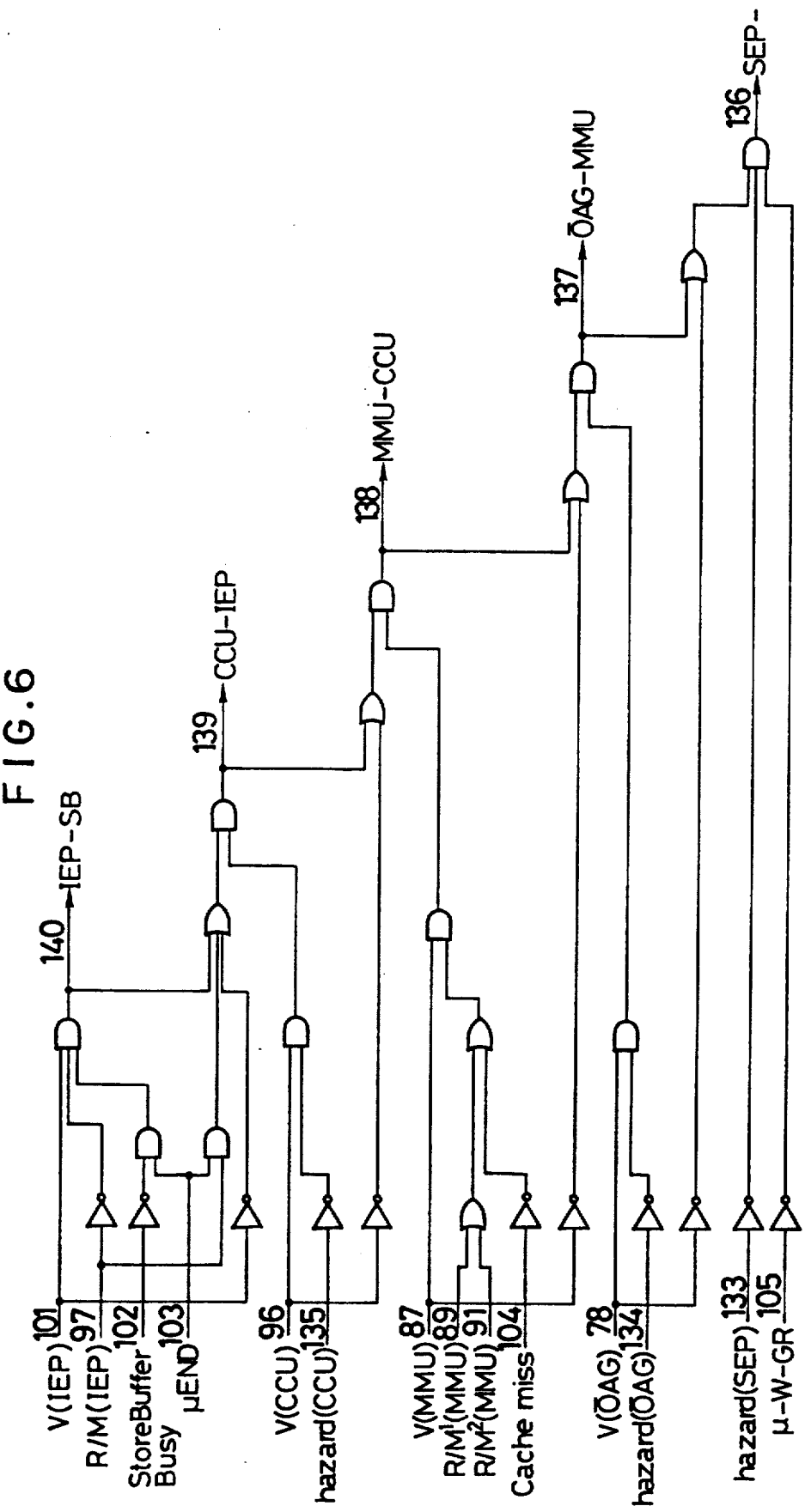
FIG. 6 is a view showing the details of a state control circuit shown in FIG. 5.

FIG. 6 is a circuit diagram showing a concrete example of the state control circuit 120 shown in FIG. 5.

Pipeline processing operation of the microprocessor according to the present invention will generally be explained with reference to FIG. 1.

The pipeline processing operation will be carried out as follows:

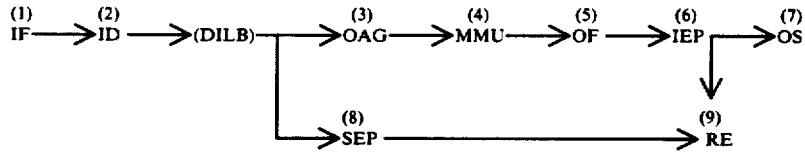

(1) IF (instruction fetch) stage

In the instruction fetch unit (IFU) 1, instructions are fetched from the instruction cache 8.

(2) ID (instruction decode) stage

In the decode unit (DCU) 2, the instructions are decoded in the decoder 10 to convert the instructions into internal instruction formats. The instructions converted into the internal instruction formats are stored in the decoded instruction loop buffer 11. The internal instruction formats may be of two kinds, one for the basic instruction having no memory operand and the other for basic instruction having a memory operand or the high-function instruction requiring complicated processes. These two kinds of internal instruction formats are issued from the instruction issue logic (IIL) 12.

(3) OAG (operand effective address calculation) stage

The address generator 47 of the operand address generator (OAG) 20 calculates an effective address (a logic address) of a memory operand of the instruction issued by the instruction issue logic (IIL) 12.

(4) MMU (address conversion in memory management unit) stage

With the translation lookaside buffer 21 of the memory management unit (MMU) 5, the logic address of the memory operand of the high-function instruction is converted into a physical address. The protection logic 22 checks memory protection.

(5) OF (operand fetch) stage

The memory operand is read out of the data cache 23 of the cache control unit (CCU) 6. A register operand is read also in this stage.

(6) IEP (instruction execution) stage

The integer execution processor (IEP) 18 of the execution unit (EXU) 4 executes the basic instruction having a memory operand or the high-function instruction under the control of microinstructions.

(7) OS (operand store) stage

A result of the execution in the integer execution processor (IEP) 18 is written in the store buffer 24 of the cache control unit (CCU) 6. This stage is involved only when a destination of the instruction is a memory. Then, the result of execution written in the store buffer 24 is written in the data cache 6 as well as in the main storage located outside the microprocessor in asynchronism with the pipeline process.

(8) SEP (instruction execution in simple execution processor) stage

The simple execution processor (SEP) 17 of the execution unit (EXU) 4 executes the basic instruction issued by the instruction issue logic (IIL) 12 under hardwired control. The simple execution processor (SEP) 17 executes only the basic instructions having no memory operand.

(9) RE (reorder) stage

The results of execution from the integer execution processor IEP) 18 and simple execution processor (SEP) 17 are reordered in the reorder buffer (RB) 15 and written in the current file (CF) 13.

In the above-mentioned pipeline stages, each stage except the IEP stage (6) is basically terminated in a single cycle. However, if a cache miss or a TLB miss occurs, a plurality of cycles are needed for each of the IF, MMU and OF stages (1), (4) and (5). Further, if a hazard occurs in the case of, for example, using a result of execution in the IEP stage (6) for calculating an effective address, so-called queuing may occur so that each stage may not be terminated in one cycle.

The prototype is characterized by the plurality of instruction execution portions that execute instructions in parallel. Namely, a point of novelty in the prototype of the invention is that the SEP and RE stages (8) and (9) are newly added to the conventional stages.

Characteristic processing operation of the prototype will be explained in detail with reference to FIGS. 7 and 8.

Figure 8:
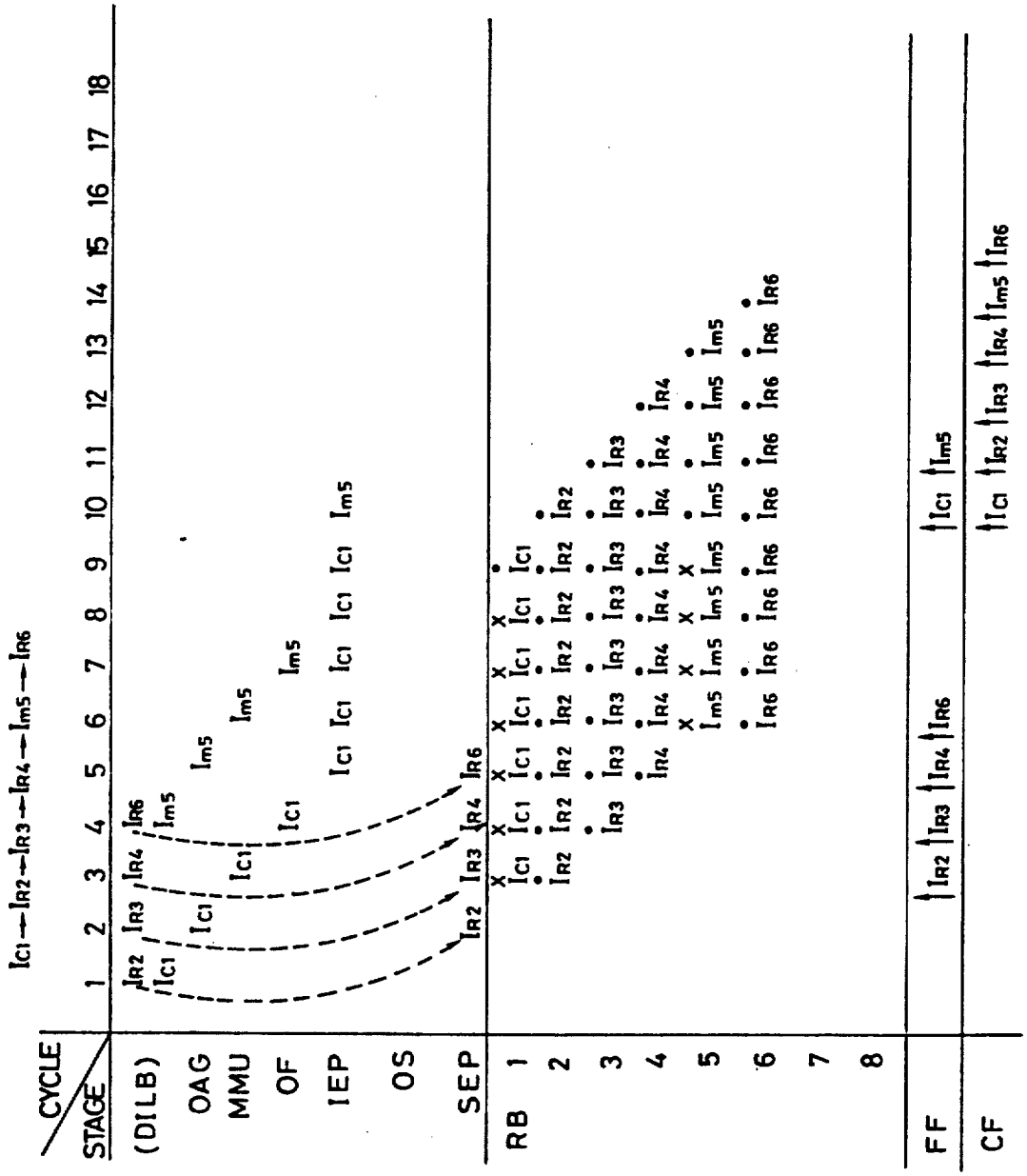

FIGS. 7 and 8 show examples of the timing of instructions pipeline-processed according to the prototype of the present invention having the simple execution processor (SEP) 17. The example of FIG. 7 corresponds to the conventional example of FIG. 12, while the example of FIG. 8 corresponds to the conventional example of FIG. 13.

For the sake of simplicity, FIGS. 7 and 8 show the pipeline stages after the decoded instruction loop buffer (DILB) 11, and it is assumed that instructions are currently in the DILB 11.

In the pipeline timing chart (Example 1) of FIG. 7, the instructions are in a sequence of Im1, IR2, Im3, IR4, Im5 and IR6. A pair Im (the high-function instruction) and IR (the basic instruction) of the instructions are simultaneously read in a single cycle from the DILB 11. Destinations of the instructions Im1 and Im3 are registers, while a destination of the instruction Im5 is a memory. It is assumed that no hazard occurs.

In a cycle 1, information pieces for the two instructions Im1 and IR2 are read out of the DILB 11 and set in the registers OAGR 30 and SEPR 34 of the instruction issue logic (IIL) 12, respectively.

In a cycle 2, the instruction Im1 is issued from the instruction issue logic (IIL) 12, and an effective address of a memory operand of the high-function instruction Im1 is calculated in the operand address generator (OAG) 20.

In a cycle 3, the effective address of the memory operand is converted into a physical address in the translation lookaside buffer (TLB) 21.

In a cycle 4, the memory management unit (MMU) 5 fetches the operand according the physical address.

In a cycle 5, the high-function instruction Im1 is executed in the integer execution processor (IEP) 18. Since the destination of the instruction Im1 is a register, a result of the execution is written in the future file (FF) 14 as indicated with " ↑ Im1" in a column "FF" of FIG. 7.

In parallel with the above-mentioned processes, in the cycle 2, the basic instruction IR2 is issued from the instruction issue logic (IIL) 12 and executed in the simple execution processor (SEP) 17.

In the cycle 3, a result of the execution of the instruction IR2 is written in the future file (FF) 14 as indicated with "IR2" in the column "FF" of FIG. 7.

Information related to each high-function instruction Im is registered in the reorder buffer (RB) 15 in the effective address calculation stage, while information related to each basic instruction IR is registered in the reorder buffer (RB) 15 in the execution stage carried out in the simple execution processor (SEP) 17. Therefore, as shown in FIG. 7, information pieces related to the instructions Im1 and IR2 are registered in the reorder buffer (RB) 15 in the cycle 3. A reference mark "x" on the top of an instruction character in the column "RB" of FIG. 7 indicates that the instruction is being executed, while a reference mark "." indicates that execution of the instruction has been terminated.

A result of execution of an instruction is written from the reorder buffer (RB) 15 to the current file (CF) 13 in a cycle in which information of the instruction in question is erased from the reorder buffer (RB) 15.

In the case of the high-function instruction Im1, information of the instruction Im1 is deleted from the reorder buffer (RB) 15 in a cycle 7 so that the result of execution of the instruction Im1 is written in the current file (CF) 13 in the cycle 7.

In the case of the basic instruction IR2, information of the instruction IR2 is deleted from the reorder buffer (RB) 15 in a cycle 8 so that the result of execution of the instruction IR2 is written in the current file (CF) 13 in the cycle 8.

The future file (FF) 14 is updated (written) as soon as an instruction is executed. Therefore, the contents of the future file (FF) 14 are not in the order of the program sequence. However, the current file (CF) 13 is updated whenever instruction information is deleted from the reorder buffer (RB) 15 so that results of execution of instructions stored in the current file (CF) 13 are in the order of the program sequence.

The instructions Im3, IR4, Im5 and IR6 are processed in a manner similar to that mentioned above.

FIG. 8 is a pipeline timing chart (Example 2) for a sequence (program sequence) of high-function and basic instructions Ic1, IR2, IR3, IR4 and Im5. The high-function instruction Ic1 needs a long time to execute and, during the execution of the instruction Ic1, the basic instructions IR2, IR3 and IR4 are executed and terminated in the simple execution processor (SEP) 17.

For the high-function instruction Ic1, an effective address of a memory operand is calculated, the effective address converted into a physical address, and the operand fetched according to the physical address, in cycles 2 to 4. In cycles 5 to 8, the instruction Ic1 is executed in the integer execution processor (IEP) 18. In a cycle 9, a result of the execution is written in the future file (FF) 14.

In parallel with these processes, the basic instruction IR2 is executed in the cycle 2 in the simple execution processor (SEP) 17. In the cycle 3, a result of the execution is written in the future file (FF) 14.

A result of execution of an instruction is written from the reorder buffer (RB) 15 to the current file (CF) 13 in a cycle where information related to the instruction in question is deleted from the reorder buffer (RB) 15. Therefore, similar to the example of FIG. 7, the current file (CF) 13 stores results of execution of instructions in the order of the program sequence.

Under a normal instruction executing state, general-purpose register values held in the future file (FF) 14 are different from those held in the current file (CF) 13. The reason for this is because execution of basic instructions having no memory operand and positioned behind high-function instructions having memory operands in a program sequence is terminated in the simple execution processor (SEP) 17 before execution of the high-function instructions positioned in front of the basic instructions in the program sequence is terminated in the integer execution processor (IEP) 18, to update the future file (FF) 14.

If an error (interruption) occurs on an instruction executed in the integer execution processor (IEP) 18, values of the future file,(FF) 14 will be returned to values of the current file (CF) 13 to securely restart the instruction. To do so, a counter register 119 is provided. In a microprogram routine for handling the interrupt process, the counter register 119 may be utilized to copy values of the CF 13 to the FF 14.

Figure 9:
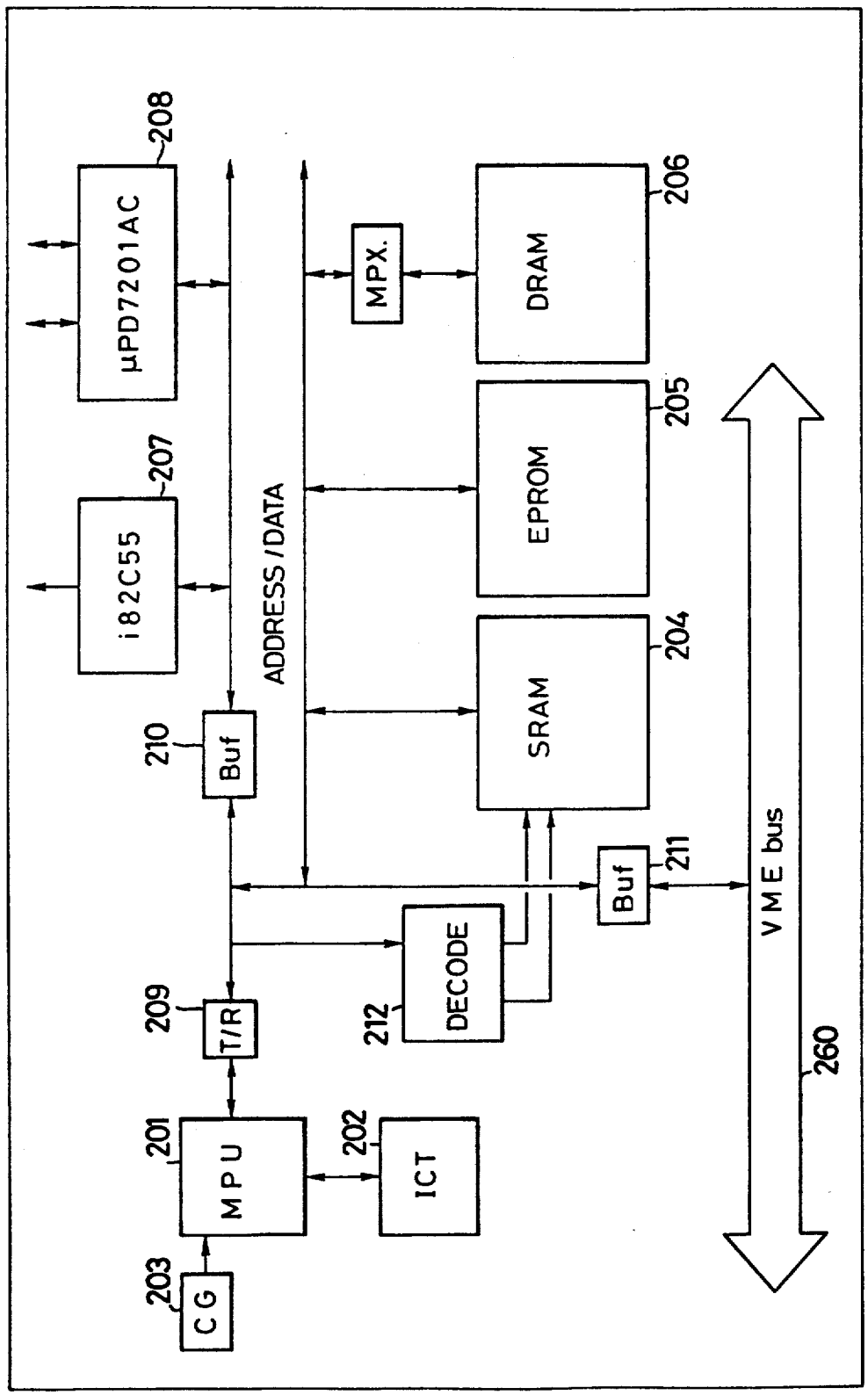
FIG. 9 is a schematic diagram showing a system comprising an MPU according to an embodiment of the present invention and peripheral LSIs.

FIG. 9 is a view showing an example of a system comprising prototype MPU according to an embodiment of the present invention and peripheral LSIs. This is a relatively simple example connected to a VME bus 260 and composed of the following LSIs and ICs:

an MPU 201;
an interrupt controller ICT 202;
a clock generator CG 203;
an SRAM (0 wait, 32 kilobytes) 204;
an EPROM (0 wait, 32 kilobytes) 205;
a DRAM (3 waits, 4 megabytes) 206;
one channel of Centronics communication interface 207;
two channels of RS232C communication interfaces 208;
a transceiver/receiver T/R 209;
buffers 210 and 211; and
an address decoder 212.

The system arrangement employing the MPU according to the prototype of the present invention is quite the same as a system arrangement employing a conventional MPU. Namely, by using the MPU according to the prototype, a high performance system will be constituted with no additional circuits.

A microprocessor according to the embodiment of the present invention will be explained with reference to FIGS. 10 and 11.

Although the prototype of the present invention employed the reorder buffer 15 to achieve the object of the present invention, the embodiment of the present invention does not employ the reorder buffer 15 to achieve the same object.

Figure 10B:
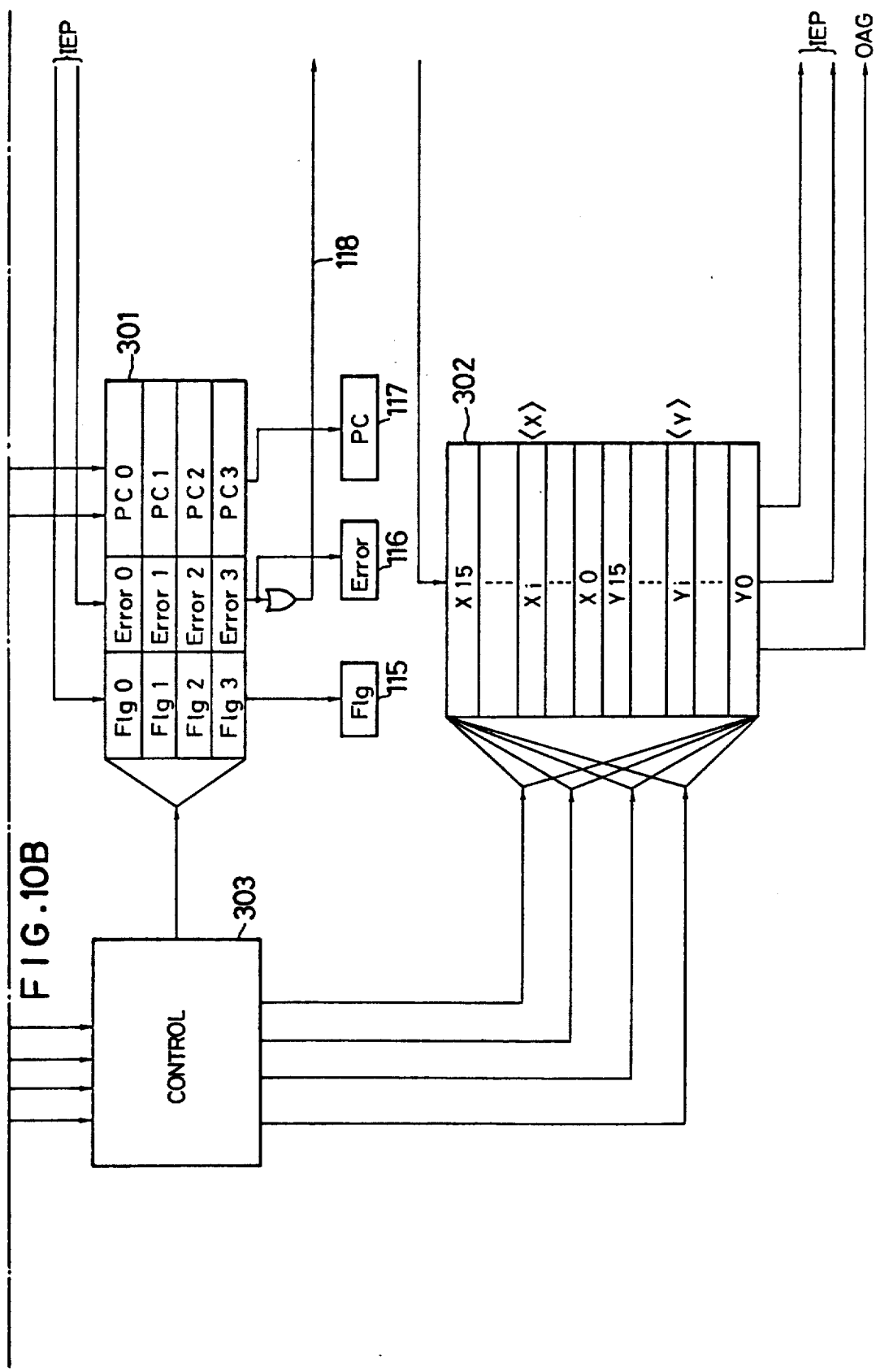
FIG. 10 is a view showing the essential connection of a general-purpose register control circuit shown in FIG. 10A and FIG. 10B.

FIG. 10 of the embodiment of the present invention corresponds to FIG. 4 of the prototype. In FIG. 10, the same elements as those of the prototype are represented with the same reference numerals. The embodiment of the invention differs from the prototype in the following points.

Firstly, the reorder buffer 15 of the prototype is eliminated in the embodiment of the invention.

Secondly, the current and future files 13 and 14 of the prototype are realized by a single general-purpose register file 302 in the embodiment of the invention. The number of entries (registers) of the register file 302 is 32 in total, i.e., 16 in a section $<X>$ and 16 in a section $<Y>$. In addition, the embodiment of the invention is provided with a status file 301 of four entries for temporarily holding flags FLG 0 to FLG 3, error information Error 0 to Error 3 and program counters PC 0 to PC 3, and a general-purpose register control circuit (GR Control) 303 for generating write/read signals for the general-purpose register file 302.

As described before, the general-purpose register file 302 of the embodiment of the invention comprises 32 entries (registers) in total, i.e., 16 entries (registers) in the section $<X>$ and 16 entries (registers) in the section $<Y>$. Similar to the current file (CF) 13 and future file (FC) 14 of the prototype, the sections $<X>$ and $<Y>$ provide each pair of registers Xi and Yi for each general-purpose register Ri.

However, unlike the prototype, the sections $<X>$ and $<Y>$ are not stationary. For example, they are not like the section $<X>$ as a current file and the section $<Y>$ as a future file. If a register Xi of the section $<X>$ is holding a current value, a corresponding register Yi of the section $<Y>$ is holding a future value. On the contrary, if the register Yi is holding the current value, then the register Xi is holding the future value.

In this way, the two registers Xi and Yi of each pair are dynamic in changing their roles with respect to the corresponding general-purpose register Ri. For example, the roles of the registers Xi and Yi of the sections $<X>$ and $<Y>$ at a certain instant will be as follows:

current value registers: X0, X1, X2, Y3, X4, X5, Y6 Y7, Y8, X9, X10, X11, X12, X13, Y14 and Y15 future value registers: Y0, Y1, Y2, X3, Y4, Y5, X6, X7, X8, Y9, Y10, Y11, Y12, Y13, X14 and X15.

Figure 11:
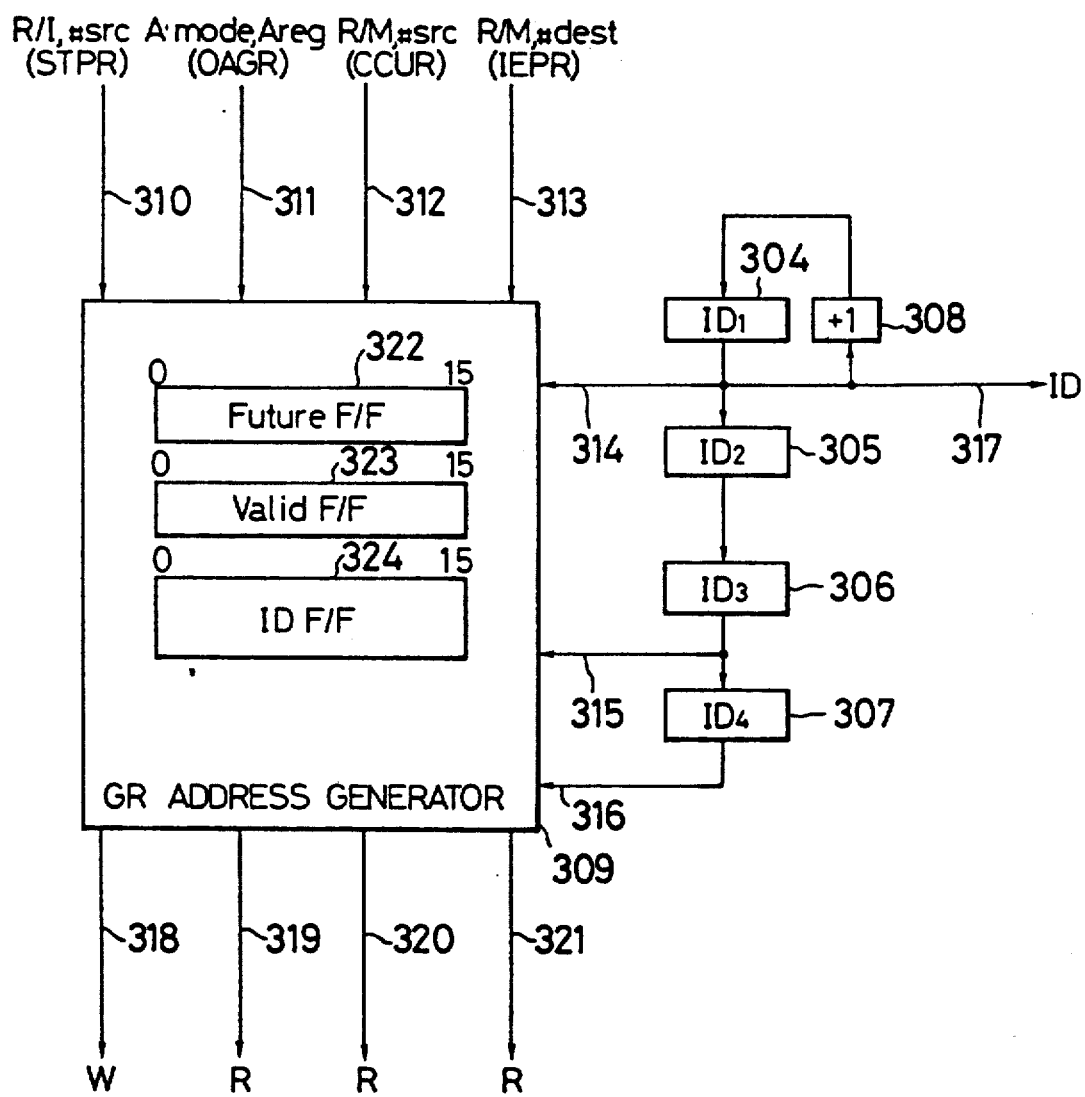
FIG. 11 shows the general purpose register control circuit of FIG. 10B.

FIG. 11 shows internal blocks of the general-purpose register (GR) control circuit 303 shown in FIG. 10. In FIG. 11, the GR control circuit 303 comprises four ID registers 304 to 307, a plus one (+1) circuit 308 and a GR address generator 309. The GR address generator 309 receives information pieces 310 to 313 related to access of the general-purpose register file 302 from the pipeline registers. The GR address generator 309 also receives ID register values 314 to 316. The GR address generator 309 outputs read/write address signals 318 to 321 to the general-purpose register file 302. Inside the GR address generator 309, there are three flip-flop groups 322 to 324 for indicating states of the general-purpose register file 302.

In the case of the pipeline arrangement of the prototype, a program sequence of instructions and an executing order of the instructions may not be equal to each other but may be reversed, if there are high-function instructions Ic and a train of basic instructions IR following each of the high-function instructions Ic in the program sequence. Here, the high-function instructions Ic have memory operands or require several cycles for their execution respectively, while the basic instructions IR have no memory operand. In this sort of pipeline arrangement, execution of the basic instructions IR may be terminated earlier than execution of four, at maximum, of the high-function instructions Ic.

Assuming there is the following instruction sequence:

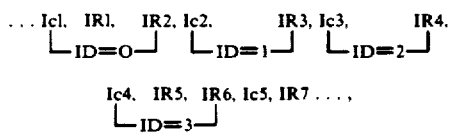

and if the number of cycles in the execution stage of the instruction Ic1 is large, execution of the instructions IR1 and IR2 is terminated before the instruction Ic1. The instruction IR3 is completely executed before the instructions Ic1 and Ic2 are executed and terminated. The instruction IR4 is completely executed before the instructions Ic1, Ic2 and Ic3. The instructions IR5 and IR6 are completely executed before the instructions Ic1, Ic2, Ic3 and Ic4. Here, it is assumed that no hazard occurs. The instruction IR7 is not executed until the instruction Ic1 is completely executed.

In this case, a problem is that, if an exception occurs during the execution of the instruction Ic1, the general-purpose registers and the statuses such as flags and program counters (PCs) which have been updated after the execution of the instructions IR1 to IR6 will restore their original states.

To cope with this, each of the results of execution of the instructions IR1 to IR6 is firstly written in each register, for example, Yi which makes a pair with a register Xi holding a current value in the general-purpose register file 302. At the same time, statuses such as the flags and PCs are temporarily written in the status file 301.

Then, in a cycle where a certain high-function instruction Ic which is positioned just in front of certain basic instructions IR, is completely executed, the roles of the registers Xi and Yi holding the current values and the resultant values of execution of the certain basic instructions IR are swapped.

Namely, in the above mentioned example, in a cycle where execution of the high-function instruction Ic is terminated, the roles of the registers Xi and Yi relating to the basic instruction IR1 are swapped, and also the roles of the registers Xi and Yi relating to the basic instruction IR2 are swapped.

An advantage of this method is that any number of basic instructions IR following high-function instructions Ic can be executed before the instructions Ic are completely executed, subject to the condition that no hazard occurs. Unlike the prototype, there is no limitation due to the number of entries of the reorder buffer (RB) 15. Since a register Xi or Yi holding a current value is swapped with the other according to information stored in the F/F groups in the GR address generator 309, results of execution of instructions can be updated in a single cycle by swapping the roles of pairs of registers Xi and Yi in the single cycle at the time when execution of a high-function instruction Ic is completed with execution of a plurality of basic instructions IR having been completed.

How to swap the roles of registers Xi and Yi and how to control read/write operation of the general-purpose register file 302 will be explained.

ID numbers from 0 to 3 are allocated for high-function instructions Ic and basic instructions IR following the respective high-function instructions Ic. (Refer to the instruction sequence shown before.) The ID registers 304 to 307 shown in FIG. 11 hold the ID numbers of the instructions held in the pipeline registers OAGR 30, MMUR 31, CCUR 32 and IEPR 33, respectively.

For the general-purpose register file 302, the three flip-flop (F/F) groups each comprising sixteen flip-flops are provided. Namely, a future F/F group 322, a validity F/F group 323 and an identification (ID) F/F group 324 are provided for the general-purpose register file 302.

The future F/F group 322 comprises sixteen F/Fs. When a register Xi of the general-purpose register file 302 holds a current value, a corresponding future F/Fi will be "1," and when a register Yi of the register file 302 holds the current value, the corresponding future F/Fi will be "0."

The validity F/F group 323 comprises sixteen F/Fs. When a future value (i.e., a value held in a register Yi with a corresponding future F/Fi being 1, or a value held in a register Xi with the corresponding future F/Fi being 0) is valid, a corresponding validity F/Fi will be "1," and it will be "0" when the future value is not valid.

The ID F/F group 324 comprises sixteen 2-bit F/Fs. When a future value is valid, a corresponding one of the 2-bit F/Fs indicates an ID number of an instruction which has written the future value.

In accordance with the values of the F/F groups 322 to 324, the information pieces 310 to 313 from the pipeline registers for accessing the general-purpose register file 302 and the ID register values 314 to 316, the general-purpose register (GR) address generator 309 generates the read/write signals 3189 to 321 and updates the values of the F/F groups in the following manner.

1. In executing a basic instruction IR in the simple execution processor (SEP) 17, a necessary source operand register Ri is specified with the filed #src 62 of the register SEPR 34 of the instruction issue logic (IIL) 12. The register Ri will take a future value when a corresponding validity F/Fi is 1, where the future value will be a value in a register Yi if a corresponding future F/Fi is 1 while the future value will be a value in a register Xi if the future F/Fi is 0. On the contrary, the register Ri will take a current value when the validity F/Fi is 0, where the current value will be the value in the register Xi if the future F/Fi is 1 while the current value will be the value in the register Yi if the future F/Fi is 0.

2. A destination register Ri for storing a result of execution of the basic instruction IR to be executed in the simple execution processor (SEP) 17 is specified by the field #dest 63 of the register SEPR 34 of the instruction issue logic (IIL) 12. The destination register Ri will be a current register when there is no preceding instruction, i.e., when execution of all high-function instructions has been terminated (meaning that validity bits held in the fields V78, V87, V96 and V101 of the registers OAGR 30, MMUR 31, CCUR 32 and IEPR 33 are all 0). In this case, the current register will be a register Xi if a corresponding future F/Fi is 1 while the current register will be a register Yi if the future F/Fi is 0. On the contrary, the destination register Ri will be a future register when there is any preceding high-function instruction, where the future register will be the register Yi if the future F/Fi is 1 while the future register will be the register Xi if the future F/Fi is 0.

3. A general-purpose register Ri necessary for the OAG (effective address calculation) stage is specified with the fields Amode 73 and Areg 74 of the register OAGR 30 of the instruction issue logic (IIL) 12. The register Ri will take a future value when a corresponding validity F/Fi is 1, where the future value will be a value in a register Yi if a corresponding future F/Fi is 1 while the future value will be a value in a register Xi if the future F/Fi is 0. On the contrary, the register Ri will take a current value when the validity F/Fi is 0, where the current value will be the value in the register Xi if the future F/Fi is 1 while the current value will be the value in the register Yi if the future F/Fi is 0.

4. A source operand specified with the fields R/M1 89 and #src 90 of the register CCUR 32 of the instruction issue logic (IIL) 12 and necessary for the IEP (integer execution) stage will take a future value when a corresponding validity F/Fi is 1, where the future value will be a value in a register Yi if a corresponding future F/Fi is 1 while the future value will be a value in a register Xi if the future F/Fi is 0. On the contrary, the source operand will take a current value when the validity F/Fi is 0, where the current value will be the value in the register Xi if the future F/Fi is 1 while the current value will be the value in the register Yi if the future F/Fi is 0. However, with the validity F/Fi being 1, if an ID number held in a corresponding ID F/Fi is not equal to an ID number held in the register ID4 307, read of the source operand is queued.

5. When a high-function instruction Ic is completely executed in the IEP (instruction execution) stage, the values of future F/Fs whose corresponding ID F/Fs are holding the same ID number as that assigned for the high-function instruction Ic and whose validity F/Fs are holding "1" are inverted while these validity F/Fs are reset to 0.

6. In executing a basic instruction IRi in the simple execution processor (SEP) 17, a register Ri for storing a result of execution of the instruction IRi is specified with the field #dest 63 of the register SEPR 34. In connection with the register Ri, if a future register which will be a register Yi if a corresponding future F/Fi is 1 and will be a register Xi if the future F/Fi is 0, has already been written by another basic instruction IR which has an ID number different from that of the basic instruction IRi, execution of the basic instruction IRi is queued. In other words, if a validity F/Fi corresponding to the register Ri is 1 and if the ID number of the basic instruction IRi is not equal to an ID number held in a corresponding ID F/Fi, the execution of the basic instruction IRi is queued.

7. Upon the completion of execution of a basic instruction IR in the simple execution processor (SEP) 17, a flag (Flg), error information (Error) and program counter fC related to the basic instruction IR are temporarily written in an entry of the status file 301 specified by a value 317 of the register ID1 304. When a high-function instruction Ic having an ID number equal to a number of the entry specified by the value 317 is completely executed, the values in the entry are set in registers Flg 115, Error 116 and PC 117 and updated.

In this way, the read/write signals 318 to 321 for the general-purpose register file 302 are controlled while values of the F/F groups are updated. Thus, the object of the present invention is achieved with relatively simple hardware.

In the prototype, when an interrupt occurs, values of the future file (FF) 14 will be returned to values of the current file (CF) 13. To do so, at least 16 cycles are needed if there are 16 general-purpose registers. This will be an overhead deteriorating performance of the microprocessor. According to the embodiment of the invention, such an operation is carried out in the single general-purpose register file 302 so that, even if an interrupt occurs, values do not need to be returned to current values. Therefore, the embodiment of the invention will not deteriorate performance of the microprocessor.

In the prototype, the number of basic instructions which follow preceding high-function instructions in a program sequence and are to be executed before the termination of execution of the preceding high-function instructions is limited by the number of entries of the reorder buffer (RB) 15. Namely, if the number of the entries is small, performance of the microprocessor may decrease, while, if the number if large, the amount of hardware may increase. In the of the invention embodiment, the single general-purpose register file 302 has the sections X and Y which swap their roles to control write and read operations so that the number of basic instructions which can be executed before the completion of execution of preceding high-function instructions may be increased.

In the prototype, when branch prediction is carried out as a high-speed branching technique and if the branch prediction fails, at least 16 cycles are necessary for restoring values of the general-purpose registers. This will be an overhead deteriorating performance of the microprocessor. In the embodiment of the invention, the values of the general-purpose registers are not required to restore their original values.

In summary, according to the invention, basic instructions and high-function instructions can be pipeline-processed in parallel and independently. Therefore, operating ratios in respective pipeline stages are prevented from deteriorating, and pipeline disturbance can be suppressed. As a result, performance of the microprocessor can be greatly improved.

Various modifications will become possible for those skilled in the art after receiving the teachings of the present disclosure without departing from the scope thereof.

What is claimed is:

1. A pipeline microprocessor comprising:
  an instruction fetch unit for storing instructions to be executed;
  a decoding unit, operatively connected with said instruction fetch unit, for receiving said instructions from said instruction fetch unit and decoding said instructions;

an instruction issue unit, operatively connected with said decoding unit, for sequentially holding a plurality of said instructions decoded by said decoding unit in accordance with stages of a pipeline of said microprocessor, a simple instruction of said instructions being executed by hard-wired control and a complex instruction of said instructions being executed by microprogram control being separately held in said instruction issue unit in order to enable execution of said simple instruction independent of execution of said complex instruction;

an instruction execution unit, operatively connected with said instruction issue unit, comprising a simple execution processor for executing said simple instruction and an integer execution processor for executing said complex instruction, execution of said simple instruction and said complex instruction being carried out in parallel;

a plurality of pairs of general registers, operatively connected with said execution unit, one general register of each said pair being for storing a result of an execution of an instruction after completion of any preceding instruction and another general register of each said pair being for storing a result of an execution obtained before a preceding instruction has been completed; and a control unit, operatively connected with said instruction issue unit and said pairs of general registers, for selecting one of said pair of general registers from which to read operand data or address index data and/or in which to store a result of execution; and information holding means, operatively connected with said instruction issue unit and said control unit, for temporarily storing information about flags, errors and program counters of some simple instructions whose execution has been completed before a preceding instruction has been completed.

2. The pipeline microprocessor of claim 1, wherein: said control unit includes future information holding circuits indicative of which general register of each said pair of general registers is provided to hold a definitely settled result, valid information holding circuits indicative of whether or not another general register of each said pair of general registers holds a valid result and identification information holding circuits indicative of identification information of said complex instructions, each item of identification information being indicative of which of said another general register of each said pair has been updated by a simple instruction executed in parallel with a preceding complex instruction;

said control unit updating some of said future information holding circuits and a corresponding number of said valid information holding circuits when execution of one of said complex instructions indicated by a corresponding item of said identification information is completed;

said instruction execution unit operating with reference to said future information holding circuits, said valid information holding circuits and said identification information holding circuits.

3. The pipeline microprocessor of claim 2, wherein said pairs of general registers are formed in a single register file.

4. The pipeline microprocessor of claim 1, wherein said control unit comprises:

a plurality of first flip-flops, in one-to-one correspondence with said pairs of said general registers, for indicating which general register of each said pair of said general registers holds a definitely settled result and which general register of each said pair of said general registers holds a result of execution of a simple instruction obtained before a preceding complex instruction of said complex instructions has been completed;

a plurality of second flip-flops, in one-to-one correspondence with said pairs of said general registers, for indicating whether or not said one general register of each said pair of said general registers storing a result of execution of a simple instruction obtained before a preceding complex instruction of said complex instructions has a content which is valid;

means for assigning an identification number to each complex instruction decoded and stored in said instruction issue unit;

means for holding said identification number assigned to each complex instruction decoded and stored in said instruction issue unit;

a plurality of information holding means, in one-to-one correspondence with said pairs of general registers, for holding said identification number of said complex instruction decoded and assigned to each simple instruction which is located thereafter and before a subsequent complex instruction in a program sequence and whose execution result is stored in one of said general registers corresponding to one of said second flip-flops indicating validity; and means for inverting states of corresponding first flip-flops and second flip-flops, when execution of one complex instruction of said complex instructions is completed, if a corresponding second flip-flop indicates validity of a result of one simple instruction of said simple instructions having an identification number of said one complex instruction of said complex instructions.

5. A pipeline microprocessor, comprising:

an instruction fetch unit for storing instructions to be executed;

a decoding unit, operatively connected with said instruction fetch unit, for receiving said instructions from said instruction fetch unit and for decoding said instructions;

an instruction issue unit, operatively connected with said decoding unit, for receiving and sequentially holding a plurality of said instructions decoded by said decoding unit in accordance with stages of a pipeline of said microprocessor, said instruction issue unit separately holding a simple instruction of said instructions to be executed by hard-wired control and a complex instruction of said instructions to be executed by microprogram control in order to enable execution of said simple instruction independent of said complex instruction;

an instruction execution unit, operatively connected with said instruction issue unit, comprising a simple execution processor for executing said simple instruction and an integer execution processor for executing said complex instruction, said simple execution processor and said integer execution processor respectively carrying out execution of said simple instruction and said complex instruction in parallel;
a plurality of pairs of general registers, operatively connected with said instruction execution unit, one general register of each pair of said general registers storing a result of execution of an instruction obtained after completion of any preceding instruction and another general register of each pair of said general registers storing a result of execution of an instruction obtained before completion of a preceding instruction; and
a control unit, operatively connected with said instruction execution unit and said pairs of general registers, for maintaining information about which general register of each pair of said general registers holds said result of execution of an instruction obtained after completion of any preceding instruction,
said control unit including
  future information holding circuits for holding information indicative of which general register of each pair of said general registers holds a definitely settled result,
  valid information holding circuits for holding information indicative of whether another general register of each pair of said general registers holds a valid result, and
  identification information holding circuits for holding information indicative of identification information of said complex instruction, each item of said identification information being indicative of which said another general register of each pair of said general registers has been updated by a simple instruction executed in parallel with a preceding complex instruction,
said control unit updating some of said future information holding circuits and a like number of said valid information holding circuits when execution of one of said identification instructions indicated by a corresponding item of said identification information is completed;
said instruction execution unit operating with reference to said future information holding circuits, said valid information holding circuits and said identification information holding circuits.

* * * * *